United States Patent [19]
Nishi et al.

[11] Patent Number: 4,897,636
[45] Date of Patent: Jan. 30, 1990

[54] VIDEO DISPLAY CONTROL SYSTEM FOR MOVING DISPLAY IMAGES

[75] Inventors: Kazuhiko Nishi; Takatoshi Ishii; Ryozo Yamashita, all of Tokyo; Shigemitsu Yamaoka, Hamamatsu; Takatoshi Okumura, Hamamatsu; Minoru Morimoto, Hamamatsu, all of Japan

[73] Assignees: ASCII Corporation, Tokyo; Nippon Gakki Seizo Kabushiki Kaisha, Hamamatsu, both of Japan

[21] Appl. No.: 139,170

[22] Filed: Dec. 21, 1987

Related U.S. Application Data

[63] Continuation of Ser. No. 721,059, Apr. 8, 1985, abandoned.

[30] Foreign Application Priority Data

| Apr. 10, 1984 | [JP] | Japan | 59-71593 |
| Apr. 12, 1984 | [JP] | Japan | 59-73586 |
| Apr. 12, 1984 | [JP] | Japan | 59-73587 |
| May 25, 1984 | [JP] | Japan | 59-106090 |
| May 25, 1984 | [JP] | Japan | 59-106091 |

[51] Int. Cl.$^4$ ............................................. G09G 1/00
[52] U.S. Cl. ................................... 340/724; 340/723; 340/725; 340/799
[58] Field of Search ............... 340/721, 723, 724, 725, 340/726, 727, 744, 747, 750, 798, 799; 364/518, 521

[56] References Cited

U.S. PATENT DOCUMENTS

| 4,439,762 | 3/1984 | Van Vliet et al. | 340/799 |
| 4,688,190 | 8/1987 | Bechtolsheim | 340/799 |

FOREIGN PATENT DOCUMENTS

| 0075963 | 4/1983 | European Pat. Off. . |
| 2517448 | 6/1983 | European Pat. Off. . |
| 0092995 | 11/1983 | European Pat. Off. . |
| 0095618 | 12/1983 | European Pat. Off. . |
| 2538588 | 6/1984 | European Pat. Off. . |
| 0158314 | 10/1985 | European Pat. Off. . |

Primary Examiner—David K. Moore
Assistant Examiner—Jeffery A. Brier
Attorney, Agent, or Firm—Cushman, Darby & Cushman

[57] ABSTRACT

A video display control system is capable of moving a part of a still image from a first display area to a second display area on a screen. The video display control system includes a memory composed of a plurality of memory locations for storing a plurality of display data representative of images of display elements on the screen. First and second registers retain first and second area data representative of the first and second display areas, and an address data generator generates from these area data first and second address data, the first address data indicating memory locations which store display data corresponding to the first display area, the second address data indicating second memory locations which store display data corresponding to the second display area. A reading circuit reads the display data in the first memory locations in accordance with the first address data, while a writing circuit writes the read display data into the second memory locations in accordance with the second address data. This video display control system further includes another reading circuit and an operation circuit. This reading circuit reads the display data in the second memory locations and feeds the read display data to the operation circuit which effects an operation such as a logical operation or a transparency processing on each pair of the display data read from the first and second memory locations.

14 Claims, 16 Drawing Sheets

FIG.4a
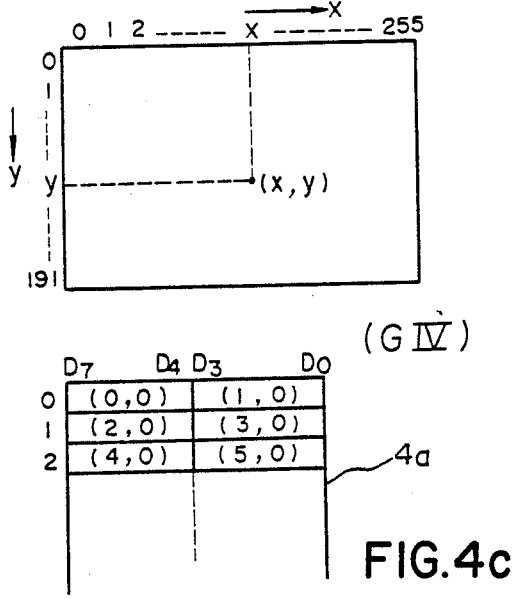
FIG.4b
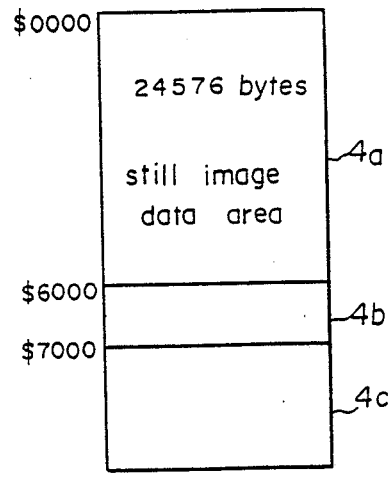
FIG.4c
FIG.5a
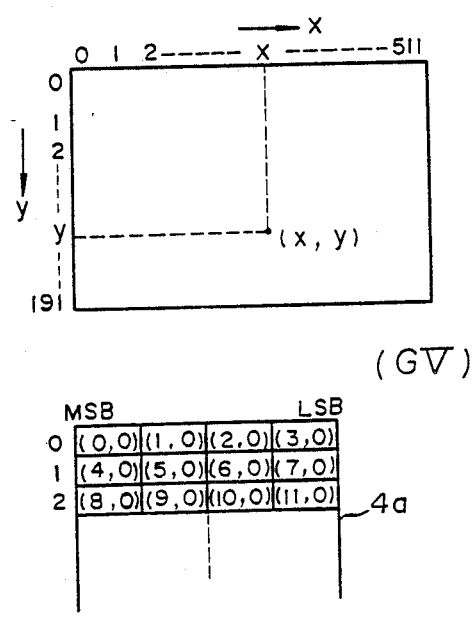
FIG.5b
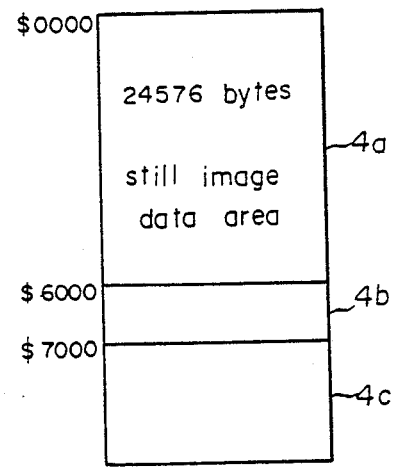
FIG.5c

FIG.6a
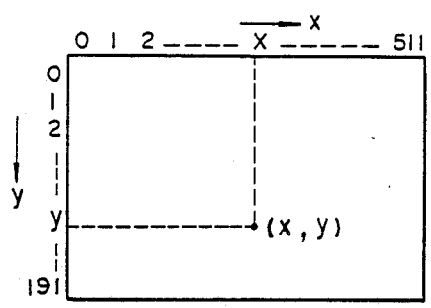
FIG.6b
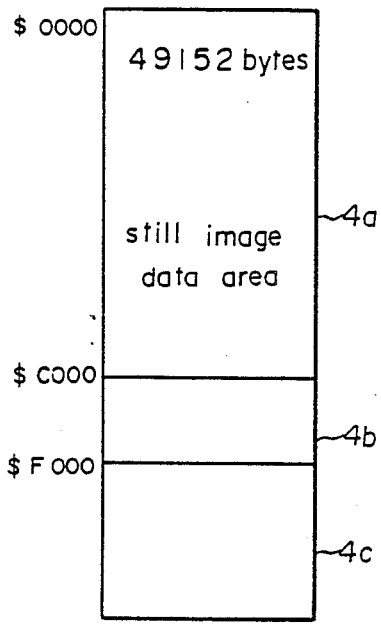
FIG.6c
(G VI)
FIG.7a
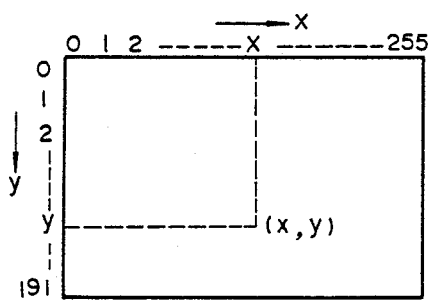
FIG.7b
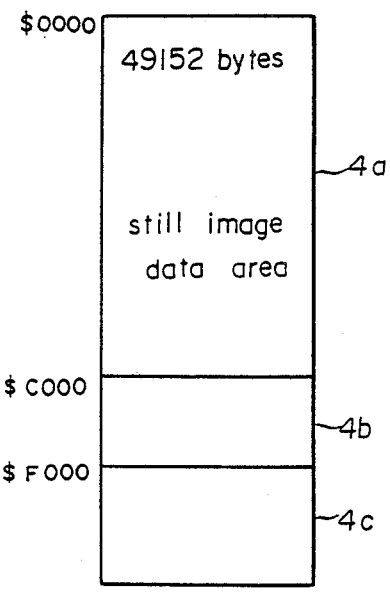
(G VII)
FIG.7c

DIRX = 0
DIRY = 0

DIRX = 0
DIRY = 0

DIRX = 1
DIRY = 0

DIRX = 1
DIRY = 1

MXD = "1"
MXS = "0"

MXD = "0"
MXS = "0"

MXD = "1"
MXS = "1"

MXD = "0"
MXS = "1"

VIDEO DISPLAY CONTROL SYSTEM FOR MOVING DISPLAY IMAGES

This is a continuation of application Ser. No. 721,059, filed Apr. 8, 1985, which was abandoned upon the filing hereof.

BACKGROUND OF THE INVENTION

1. Field of the Invention

This invention relates to a video display control system adapted to be connected to a video display unit such as a CRT video monitor for displaying a video image on a screen of the video display unit.

2. Prior Art

In recent years, video display control systems capable of displaying both of still and animation pattern images on a screen of a video display unit have been extensively used in graphic video display apparatuses such as video game machines. Such conventional systems are for example, shown in U.S. Pat. Nos. 4,243,984, 4,262,302, 4,286,320, 4,374,395 and 4,387,406. FIG. 1 shows one example of the conventional systems. The system comprises a video display controller (hereinafter referred to as "VDP") 101 and a central processing unit (hereinafter referred to as "CPU") 102. The system further comprises a memory 103 which includes a ROM (read only memory) storing a variety of programs to be executed by the CPU 102 and a RAM for storing other necessary data. The CPU 102 outputs data representative of still and animation images to be displayed on a screen of a video display unit 105 to the VDP 101 which in turn stores the still and animation data into a video RAM (hereinafter referred to as "VRAM") 104. Upon receipt of a display command from the CPU 102, the VDP 101 sequentially reads the still and animation data from the VRAM 104 in accordance with scanning synchronization signals of the video display unit 105, and supplies the read data to the video display unit 105. In this way the still and animation images are displayed on the screen of the video display unit 105.

In a video display control system of the type described above, it is often desired to move a display image at a display area R1 on the screen of the video display unit 105, to another display area R2. In such a case, the CPU 102 of the conventional video display control system first reads data corresponding to the display image in the display area R1 through the VDP 101 from the VRAM 104, and temporarily stores the read data in the memory 103. The CPU 102 then reads the data from the memory 103 and supplies the read data through the VDP 101 to the VRAM 104 to store the data into a memory area of the VRAM 104 which corresponds to the display area R2. The processing to be performed by the CPU 102 to implement the above procedure requires a relatively large amount of time, and the CPU 102 cannot perform other processing during the processing of the movement of the display image.

Also, in a video display control system of the type described above, it is frequently desired to mix colors of the display elements of the display image in the display area R1 with those of the display elements of the display image in the display area R2 when such movement of image shown in FIG. 2 is performed. In the case where the display image in the display area R1 includes transparent portions, it is often desired to leave the colors of corresponding portions of the image in the display area R2 as they are. To perform such processing of colors of the images in the display areas R1 and R2, the CPU 102 of the conventional system is required to read and temporarily store the image data corresponding to the display area R2, in addition to the image data corresponding to the display area R1, and also requires to effect a certain operation on those image data.

Furthermore, it is often desired for a video display control system of the type described above to transfer image data of a display image between the VRAM 104 and an extended memory device other than the VRAM 104 to save and reproduce the display image. It is also frequently desired to write image data, which have been prepared by the CPU 102 in a memory device, into the VRAM 104 to display an image represented by the prepared image data on the screen in an instant. However, a program to be executed by the CPU 102 to perform the above-described processing is fairly complicated.

SUMMARY OF THE INVENTION

It is therefore an object of the present invention to provide a video display control system in which data representative of a display image and stored in a memory area of a VRAM corresponding to a display area of a screen can be quickly transferred to another memory area of the VRAM corresponding to another display area of the screen.

It is another object of the present invention to provide a video display control system which carries out the above-said transfer of the display image data without the intervention of a CPU.

It is a further object of the present invention to provide a video display control system in which a logical operation is effected on the data read from a memory area and the data read from another memory area of the VRAM to form new data to be written into the another memory area when such transfer of image data is performed.

It is a further object of the present invention to provide a video display control system in which a transparency processing is effected on the data read from a memory area and the data read from another memory area of the VRAM to form new data to be written into the another memory area when such transfer of image data is performed.

It is a further object of the present invention to provide a video display control system in which transfer of image data between a VRAM and an extended memory device can be performed without the intervention of a CPU.

It is a further object of the present invention to provide a video display control system in which the CPU can directly and selectively access to the VRAM and the extended memory device.

According to a first aspect of the present invention, there is provided a video display control system including memory means having a storage area composed of a plurality of memory locations for storing a plurality of display data and adapted to be connected to a video display unit for displaying, on a screen of the video display unit, an image composed of a plurality of display elements each represented by a respective one of the plurality of display data stored in the storage area of the memory means, the video display control system comprising first register means for retaining first area information representative of a first display area on the screen; second register means for retaining second area information representative of a second display area on the screen; address information generator means for generating first address information and second address information in accordance with the first area information and the second area information, respectively, the first address information indicating first memory locations of the memory means in which display data representative of images of display elements in the first display area are stored, and the second address information indicating second memory locations of the memory means in which display data representative of images of display elements in the second display area are stored; reading means for reading, in accordance with the first address information, the display data representative of images of the display elements in the first display area from the first memory locations; and writing means for writing, in accordance with the second address information, the display data read by the reading means into the second memory locations of the memory means. The video display control system may further comprise second reading means for reading, in accordance with the second address information, the display data representative of the display elements in the second display area from the second memory locations; and operation means for effecting a certain operation on each of the display data read from the first memory locations and a corresponding one of the display data read from the second memory locations to output operated display data, the writing means writing the operated display data into the second memory locations. In this case, the operation means may effect a logical operation on each of the display data read from the first memory locations and a corresponding one of the display data read from the second memory locations to output logically operated display data. Also, the video display control system may further comprise transparency data detection means for detecting display data representative of transparency from the display data read from the first memory locations to output a detection signal to the operation means. And in this case, the operation means outputs the data read from the second memory locations when the detection signal is supplied thereto, while the operation means outputs the data read from the first memory locations when the detection signal is not supplied thereto.

According to a second aspect of the present invention, there is provided a video display control system which comprises proper memory means and extended memory means each having a storage area composed of a plurality of memory locations for storing a plurality of display data; first register means for retaining first area information representative of a first display area on the screen; second register means for retaining second area information representative of a second display area on the screen; address information generator means for generating first address information and second address information in accordance with the first area information and the second area information, respectively, the first address information indicating first memory locations of the memory means in which display data representative of images of display elements in the first display area are stored, and the second address information indicating second memory locations of the memory means in which display data representative of images of display elements in the second display area are stored; third register means for retaining first and second selection data; memory selection means for selecting the proper memory means and the extended memory means in accordance with the first and second selection data, respectively; reading means for reading, in accordance with the first address information, the display data representative of images of the display elements in the first display area from the first memory locations of the memory means selected in accordance with the first selection data; and writing means for storing, in accordance with the second address information, the display data read by the reading means into the second memory locations of the memory means selected in accordance with the second selection data. The video display control system may further comprise second reading means for reading, in accordance with the second address information, the display data representative of the display elements in the second display area from the second memory locations of the memory means selected in accordance with the second selection data; and operation means for effecting a certain operation on each of the display data read from the first memory locations and a respective one of the display data read from the second memory locations to output operated display data; the writing means writing the operated display data into the second memory locations of the memory means selected in accordance with the second selection data. In this case, the operation means may effect a logical operation or a transparency processing. The video display control system may further comprise a central processing unit which has an address bus and a data bus operatively connected to data terminals of the proper memory means and the extended memory means; fourth register means for retaining third selection data supplied from the central processing unit; and address control means responsive to an output of the fourth register means for selectively feeding address information outputted onto the address bus by the central processing unit to address input terminals of one of the proper memory and the extended memory means; whereby transfer of display data is effected between the central processing unit and the selected memory means.

According to a third aspect of the present invention, there is provided a video display control system which comprises a plurality of memory means for storing a plurality of display data each representative of image of a respective one of the display elements on the screen, each of the display data being composed of at least one data portion, each of the plurality of memory means comprising a plurality of memory locations and storing corresponding portions of the plurality of display data; reading means for sequentially reading each of the display data from the plurality of memory means in accordance with the synchronization signals, the read display data being supplied to the video display unit; a central processing unit which has an address bus and has a data bus operatively connected to data terminals of the plurality of memory means; register means for retaining a selection data supplied from the central processing unit; and address control means responsive to an output of the register means for selectively feeding address information outputted onto the address bus by the central processing unit to address input terminals of one of the plurality of memory means; whereby transfer of selected portions of display data is effected between the central processing unit and the selected one of the plurality of memory means.

BRIEF DESCRIPTION OF THE DRAWINGS

FIG. 4-(a) is an illustration showing the relation between a screen and x and y coordinates of display elements (or display dots) on the screen in G IV mode;

FIG. 4-(b) is a memory map of the VRAM 4 of FIG. 3 in the GIV mode whose area is divided into a still image data area 4a, an additional memory area 4b and an animation image data area 4c;

FIG. 4-(c) is an illustration showing location of color codes stored in the still image data area 4a in the GIV mode;

FIGS. 5-(a), 6-(a) and 7-(a) are illustrations similar to FIG. 4-(a) but showing such relations in G V, G VI and G VII modes, respectively;

FIGS. 5-(b), 6-(b) and 7-(b) are illustrations similar to FIG. 4-(b) but showing such relations in the G V, G VI and G VII modes, respectively; .

FIGS. 5-(c), 6-(c) and 7-(c) are illustrations similar to FIG. 4-(c) but showing such relations in the G V, G VI and G VII modes, respectively;

FIGS. 14-(b), 14-(c) and 14-(d) are illustrations similar to FIG. 14-(a) but showing such orders when the bit data DIRX is "0" with the bit data DIRY of "1", when both of the bit data DIRX and DIRY are "1", and when the bit data DIRX is "1" with the bit data DIRY of "0", respectively;

FIGS. 23-(b), 23 (c) and 23-(d) are illustrations similar to FIG. 23-(a) but showing such movements of a display image effected when the bit data MXS is "0" with the bit data MXD of "1", when the bit data MXS is "1" with the bit data MXD of "0", and when both of the bit data MXS and MXD are "1", respectively.

DESCRIPTION OF THE PREFERRED EMBODIMENTS OF THE INVENTION

Figure 1:
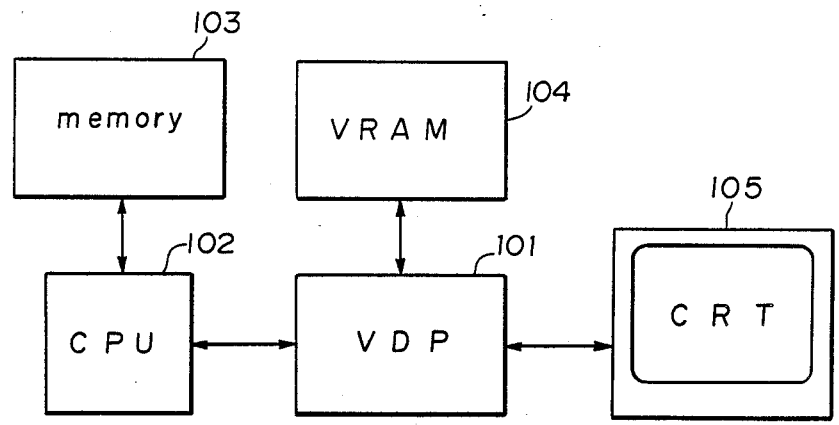
FIG. 1 is a block diagram of a conventional video display control system.
Figure 2:
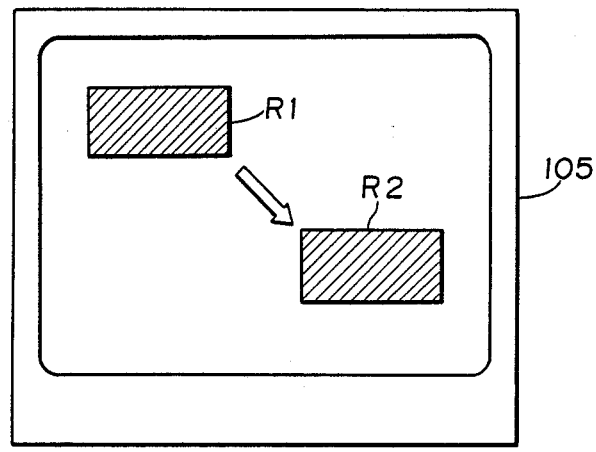
FIG. 2 is an illustration showing transfer of an image from a display area of a screen of the video display unit of the system of FIG. 1 to another display area of the screen.
Figure 3:
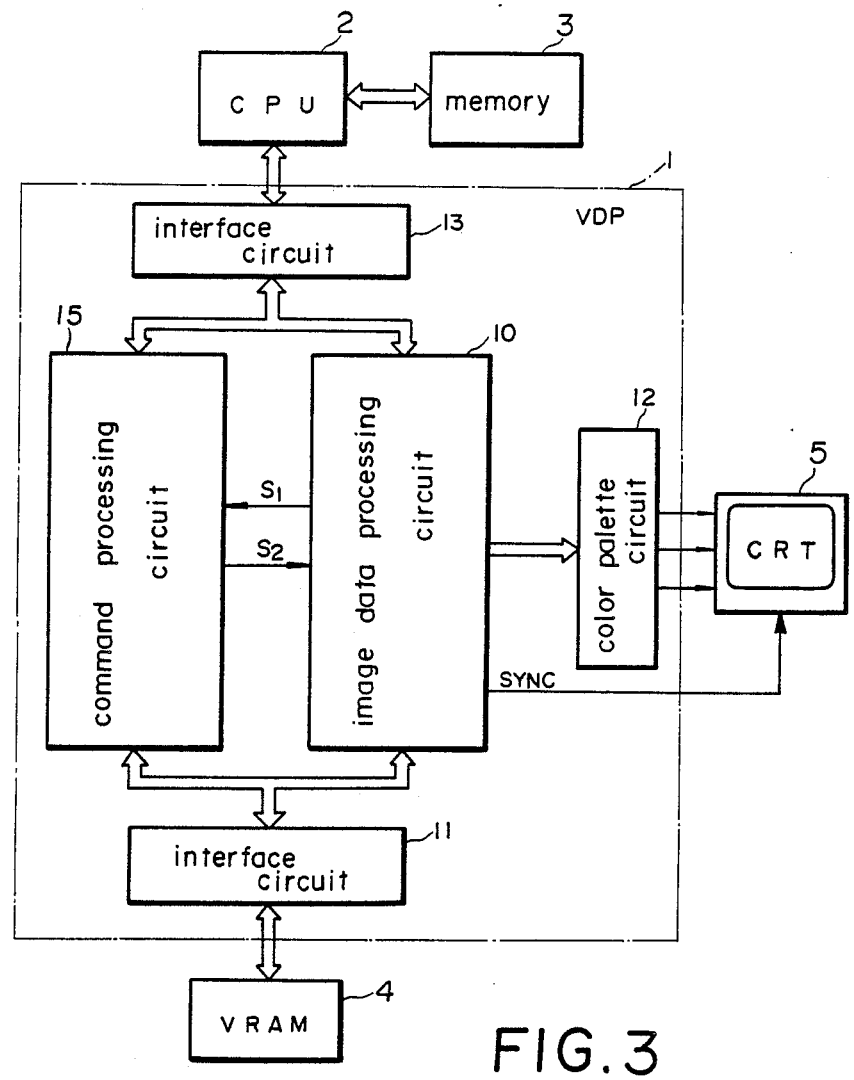
FIG. 3 is a block diagram of a video display control system provided in accordance with the present invention.

Shown in FIG. 3 is a video display control system showing a preferred embodiment of the present invention. This video display control system comprises a video display processor (hereinafter referred to as VDP) 1 which serves to display still and animation images on a screen of a display unit 5 in accordance with image data stored in a VRAM (video RAM) 4 which is for example a 128K byte memory. A variety of programs to be used by the CPU 2 and other necessary data are stored in a memory 3.

The VDP 1 comprises an image data processing circuit 10 which reads, via an interface circuit 11; still and animation image data from the VRAM 4 at a speed corresponding to the scanning speed of a screen of the video display unit 5, and supplies the data read from the VRAM 4 to a color palette circuit 12. The color palette circuit 12 in turn converts the data into analog R, G and B (red, green and blue) signals and feeds them to the video display unit 5. The image data processing circuit 10 also supplies the video display unit 5 with a synchronization signal SYNC necessary for the scanning of the screen of the video display unit 5. The still and animation image data are composed of color codes, each representing a color of a respective one of display elements (or display dots) on the screen, each of the color codes comprising two, four or eight bits as will be described later. Thus, an image corresponding to the image data can be displayed on the screen of the video display unit 5. The image data processing circuit 10 is also so constructed as to store image data, supplied from the CPU 2 via an interface circuit 13, into the VRAM 4 through the interface circuit 11. During an access to the VRAM 4, i.e., when writing data into the VRAM 4 or when reading data from the VRAM 4, the image data processing circuit 10 supplies a signal S1 to a command processing circuit 15 to inform the command processing circuit 15 that the processing circuit 10 is accessing the VRAM 4.

The command processing circuit 15 performs one of a plurality of command processing operations, which are previously programmed therein, in response to a command data fed thereto from the CPU 2 via the interface circuit 13. The command processing circuit 15 is prevented from an access to the VRAM 4 when the signal S1 is supplied thereto from the image data processing circuit 10.

A display operation of a still image on the screen of the video display unit 5 will now be described. To display a still image on the screen, the video display control system shown in FIG. 3 operates in one of a plurality of display modes which can be classified broadly into two groups. The first group includes pattern display modes for displaying selected patterns, each composed of, for example, 8×8 display elements or 8×6 display elements on the screen. The second group includes dot-map modes in which each of display elements (or dots) on the screen can be displayed in a desired color independently from the other dots. The operation of this system in the pattern display modes is almost the same as those of the conventional systems, and therefore the operation of this system only in the dot-map modes will be described here.

The dot-map modes of this system includes four kinds of modes, namely, G IV, G V, G VI and G VII modes, and the relation between memory locations of the VRAM 4 storing data representative of a still image and display position of the still image on the screen in each of the dot-map modes will be described hereinafter.

(1) G IV mode

In this G IV mode, a still image is displayed on the screen with 256×192 elements (or dots) as shown in FIG. 4-(a), and color codes equal in number and respectively corresponding to all of the elements constituting the screen are stored in a still image data area 4a of the VRAM 4 as shown in FIG. 4-(b). Each of the color codes in this display mode are composed of four bits and are stored in the area 4a in an order shown in FIG. 4-(c), each memory location or address in the still image data area 4a storing two consecutive color codes. More specifically, the first memory location or address "0" of the VRAM 4 stores a color code indicative of a color of a display element at the coordinates (0, 0) of the screen and a color code indicative of a color of a display element at the coordinates (1, 0) of the screen. Similarly, address "1" of te VRAM 4 stores color codes for display elements at the coordinates (2, 0) and (3, 0) of the screen. Each color code is thus composed of four bits, so that each element on the screen in this display mode can be displayed in a color selected from sixteen colors and the still image data area 4a occupies consecutive 24576 bytes in the VRAM 4. An area 4-c of the VRAM 4 is a memory area for storing a variety of data necessary for display of an animation image on the screen, and an area 4b is an additional memory area and is not normally used. The additional memory area 4b is located in the VRAM 4 in such a manner that the first address thereof comes next to the last address of the still image data area 4a, and stores additional color codes for displaying a still image.

(2) G V mode

In this G V mode, a still image is displayed on the screen with 512×192 elements (or dots) as shown in FIG. 5-(a), and color codes equal in number and corresponding to all of the elements constituting the screen are stored in a still image data area 4a of the VRAM 4 in the same manner as in the G IV mode. Each color code in this display mode is composed of two bits and is stored in an order shown in FIG. 5-(c). Therefore, each address in the still image data area 4a stores four color codes in this mode. The still image data area 4a occupies a consecutive 24576 bytes of the VRAM 4, as in the G IV mode. This is because even though the elements in the horizontal or the row direction X in this GV mode are double as many as those in the GIV mode, the number of bits of each color code in this display mode is half of that in the G IV mode. Each of the color codes is thus composed of two bits, so that each element on the screen in this display mode can be displayed in a color selected from four colors. An area 4b and an area 4c of the VRAM 4 in this display mode are identical to those of the VRAM 4 in G IV mode.

(3) G VI mode

In this G VI mode, a still image is displayed on the screen with 512×192 elements (or dots) as shown in FIG. 6-(a), and each color code is composed of four bits as in the G IV mode. As a result, the still image data area 4a in this display mode occupies, as shown in FIG. 6-(b), a consecutive 49152 bytes, which are double as many as those in the G IV mode. The color codes in this display mode are stored in the still image data area 4a in an order shown in FIG. 6-(c).

(4) G VII mode

In this GVII mode, each color code is composed of eight bits, so that each element on the screen can be displayed in a color selected from 256 colors. In this display mode, a still image is displayed on the screen with 256×192 elements (or dots) as shown in FIG. 7-(a), and a still image data area 4a occupies consecutive 49152 bytes of the VRAM 4 in the GVI mode. The color codes in this display mode are stored in the still image data area 4a in an order shown in FIG. 7-(c), each address of the area 4a storing one color code.

The command processing circuit 15 will now be described more specifically. The command processing circuit 15 is a circuit for decoding a variety of command data fed from the CPU 2 and performing data processing in accordance with the results of the decoding. Commands represented by the command data are classified broadly into two groups of commands. One of these groups includes high-speed move commands for performing a transfer of data on a byte basis at a high speed. The other group includes logical operations and move commands for performing both a transfer of data on a color code basis, and logical operations such as a transparency processing, AND, OR, NOT and EXCLUSIVE OR on the data to be transferred to a selected address in the VRAM 4 and data existing in the selected address and for transferring the logical operation result to the selected address in the VRAM 4. Each of the command data is composed of eight bits. The upper four bits of the command data selects one of the above-described commands, and the lower four bits of the command data selects one of the logical operations only when a logical operation and move command is selected by the upper four bits of the command data.

The command processing circuit 15 shown in FIG. 8 comprises a CPU bus (hereinafter referred to "CBUS") 19 which is connected to the CPU 2 through the interface circuit 13 (FIG. 3). The command processing circuit 15 also comprises a command register 20 for storing a command data fed from the CPU 2. The data contained in the upper four bits of the command register 20, i.e., a command selection portion of the command data, is decoded by a command decoder 21, and the decoded data is fed to a microprogram ROM 22, a jump controller 23 and a high-speed move detection circuit 24. The microprogram ROM 22 has stored in advance therein, a plurality of microprograms, each corresponding to a respective one of the commands. The output data of the command decoder 21 selects one of the microprograms, and steps or instructions of the selected microprogram are sequentially read from the microprogram ROM 22 in accordance with a count output OT2 of a program counter 25 and are fed to an instruction decoder 26. The instruction decoder 26 decodes the instructions read from the ROM 22 in accordance with a count output OT1 of the program counter 25, and feeds the results of the decoding to an arithmetic and register circuit (hereinafter referred to as "ARC") 27 as a group of control signals CONT. The instruction decoder 26 also generates control signals JMP1, JMP2 and VAS in accordance with the decode results.

The count output OT1 is ternary, while the count output OT2 is octadecimal, and the count output OT2 is incremented by one each time the count output OT1 makes a round. Thus, the instruction decoder 26 requires three steps of decoding for each of the instructions read from the microprogram ROM 22. The program counter 25 has a clock input terminal CK, a reset input terminal R, a data preset terminal PS and a count interruption terminal C. A VRAM access controller 28 controls an access to the VRAM 4 in the following manner. Assuming that the ROM 22 outputs an instruction which requires an access to the VRAM 4, the instruction decoder 26 feeds the signal VAS to the VRAM access controller 28. In response to the signal VAS, the VRAM access controller 28 determines whether the signal S1 is active, i.e., whether the image data processing circuit 10 is performing an access to the VRAM 4. And if it is determined that the signal S1 is active, the VRAM access controller 28 supplies a signal S3 to the count interruption terminal C of the program counter 25 to interrupt the count operation thereof. As a result, the instruction decoder 26 is prevented from entering into the decoding operation of the instruction fed from the ROM 22, and is thus brought into a wait state. On the other hand, if it is determined that the signal S1 is not active, the VRAM access controller 28 does not output the signal S3. Consequently, the instruction decoder 26 enters into the decoding operation of the instruction, so that an access to the VRAM 4 is effected. Thus, the VRAM access controller 28 interrupts the operation of the command processing circuit 15 to give priority to the image data processing circuit 10 when the image data processing circuit 10 and the command processing circuit 15 attempt an access to the VRAM 4 simultaneously.

A jump controller 23 provided in the command processing circuit 15 responds to each of jump instructions in the microprogram under processing, and determines an address to which a jump operation is to be performed (hereinafter referred to as "jump-to address") in accordance with states of flip-flops FF1 and FF2 provided therein. The flip-flop FF1 is brought into a set state when one of detection signals <->, <0>, <256> and <512> is applied to the jump controller 23 together with the signal JMP1, while the flip-flop FF2 is brought into a set state when one of the detection signals <-> and <0> is applied to the jump controller 23 together with the signal JMP2. The detection signals <->, <0>, <256> and <512> will be more fully described later. The jump controller 23 thus produces data indicative of a jump-to address in accordance with states of the flip-flops FF1 and FF2, value of the count output data OT2 and the output signals of the command decoder 21, and then outputs the produced jump-to address data to the data preset terminal PS of the program counter 25. The program counter 25 then outputs the preset address data as the count output OT2, so that the sequence of execution of the instructions in the microprogram under processing is changed to an instruction in the jump-to address indicated by the count output OT2.

A high-speed move detection circuit 24 determines whether the command indicated by the command data in the command register 20 belongs to the high-speed move commands, and if it is determined that the command is one of the high-speed move commands, the high-speed move detection circuit 24 outputs a signal S2 to the image data processing circuit 10. The image data processing circuit 10 is inhibited from processing the animation image data during the time when the signal S2 is being supplied thereto. The reason for this is that, in the case of the high-speed move commands, the command processing circuit 15 has to perform an access to the VRAM 4 also using time slots assigned to the processing of the animation image data in addition to those assigned to the processing of the still image data.

A logical operation decoder (hereinafter referred to as "LOP decoder") 30 decodes the data in the lower four bits of the command register 20, i.e., the data for selection of one of the logical operations, and supplies the decoded result LOPS to an LOP unit 60 (FIG. 9) in the ARC 27. The LOP unit 60 performs a logical operation selected by the decoded result LOPS supplied from the LOP decoder 30.

Figure 10:
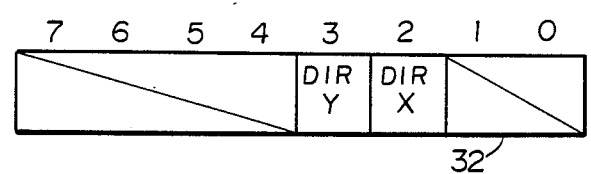
FIG. 10 is an illustration showing bit data DIRX and DIRY stored in the argument register 32 of the command processing circuit 15 of FIG. 8.

A mode register 31 stores a mode selection data supplied from the CPU 2 which indicates one of the GIV to GVII modes, and supplies the stored mode selection data MOD to the ARC 27. An argument register 32 is comprised of an eight-bit register, as shown in FIG. 10, and stores an argument data supplied from the CPU 2. The argument data includes a pair of bit data DIRX and DIRY for determining the directions in which an address of the VRAM during transferring of the color codes is advanced with respect to the column and row directions on the screen. Outputs of this argument register 32 are supplied to the ARC 27 as data ARD. A flag register 33 stores flags which serves to inform the CPU 2 of the status of this command processing circuit 15. States of the flags in the flag register 33 are controlled by a flag control circuit 34 and are outputted onto the CBUS 19.

Figure 9:
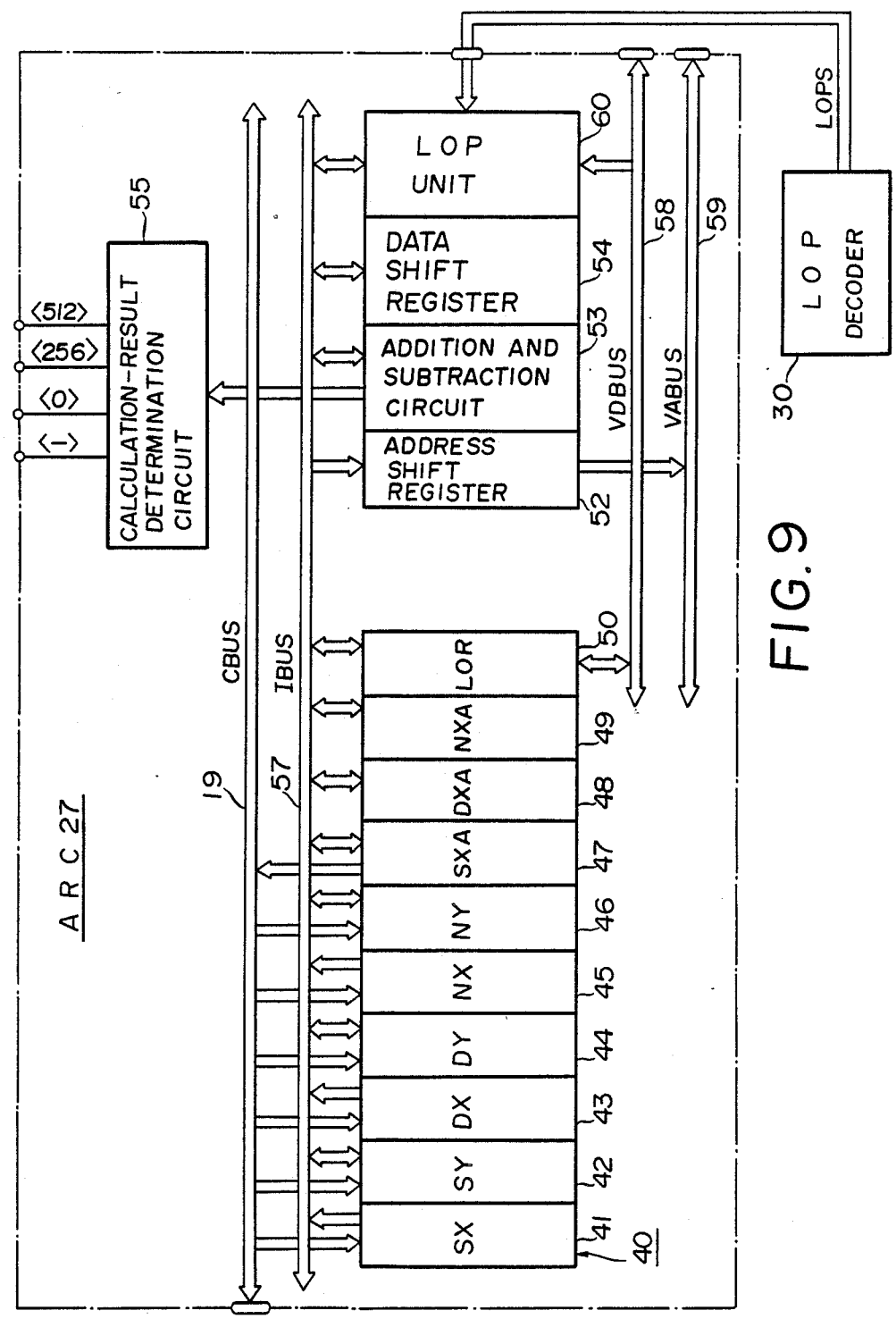
FIG. 9 is a block diagram of the arithmetic and register circuit 27 of the command processing circuit 15 of FIG. 8.

The construction of the ARC 27 will now be more fully described. As shown in FIG. 9, the ARC 27 comprises the LOP unit 60, a register section 40, an address shift register 52 for shifting an address data, an addition and subtraction circuit 53 for performing addition and subtraction of data, a data shift register 54 for shifting a color code data, and an calculation-result determination circuit 55 for determining whether the results of a calculation performed by the addition and subtraction circuit 53 is a negative value, "0", "256" or "512". The calculation-result determination 55 outputs the detection signal <-> when the calculation result obtained by the addition and subtraction circuit 53 is negative, the detection signal <0> when the calculation-result is "0", the detection signal <256> when the calculation-result is "256", and the detection signal <512> when the calculation-result is "512". The detection signals <->, <0>, <256> and <512> are supplied to the jump controller 23. The ARC 27 further comprises the CBUS 19, an internal bus (hereinafter referred to IBUS 57, a data bus 58 connected to the VRAM 4 (hereinafter referred to as "VDBUS"), and an address bus 59 connected to the VRAM 4 (hereinafter referred to "VABUS"). The register section 40 comprises SX and SY registers 41 and 42 for respectively storing column and row addresses (x and y coordinates) of a display element whose color code is to be read from the VRAM 4. Similarly, DX and DY registers 43 and 44 in the ARC 27 store column and row addresses (x and y coordinates) of a display element whose color code is to be written into the VRAM 4. An NX register 45 in the register section 40 stores the number of those of a row of display elements disposed within a selected display area on the screen. Similarly, an NY register 46 in the register section 40 stores the number of those of a column of display elements disposed within the selected display area. SXA register 47, DXA register 48 and NXA register 49 are auxiliary registers of the SX register 41, DX register 43 and NX register 45, respectively. An LOR register 50 in register section 40 temporarily stores a color code data to be subjected to a logical operation. Each of the registers 41 to 50 has a load control terminal for controlling loading of an input data thereinto and an output control terminal for controlling output of data. These load and output control terminals are supplied with the control signals CONT. When it is required to transfer data in the SX register 41 to the SXA register 47, a specific one of the control signals CONT is supplied to the output control terminal of the SX register 41 to output data therefrom, and at the same time another signal among the control signals CONT is supplied to the load control terminal of the SXA register 47 to load the output data of the SX register 41 thereinto. Thus, the data in the SX register 41 is transferred to the SXA register 47 through the IBUS 57.

Figure 11:
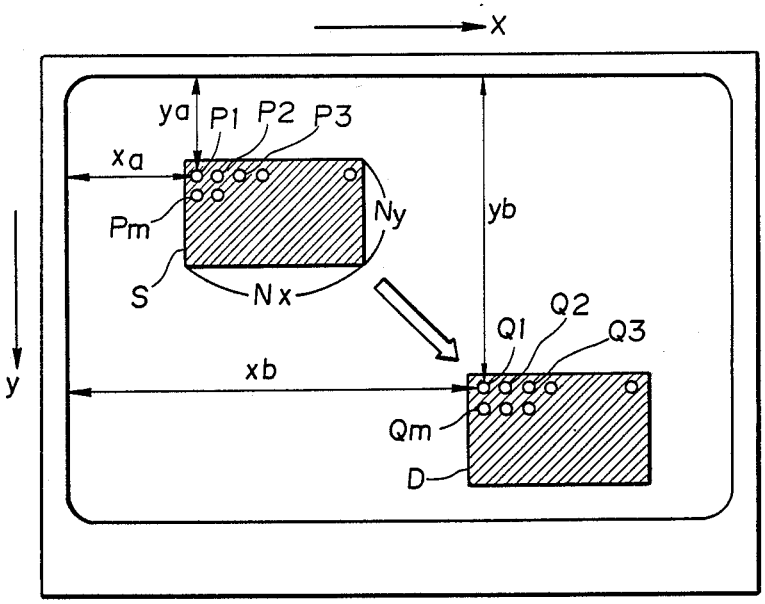
FIG. 11 is an illustration showing movement of a display image composed of Nx X Ny display elements from a source display area to a destination display area.

The operation of this video display control system will now be described. The command processing circuit 15 is so constructed as to perform processing of a command selected from twelve kinds of commands which include the aforesaid high-speed move commands and the logical operation and move commands. And hereinafter, the command processing operations of a logical move from memory to memory command (LMMM command), which is one of the logical operation and move commands, and a high speed move from memory to memory command (HMMM command), which is one of the high-speed move commands, will be described. These commands are to move, as shown in FIG. 11, an image displayed in a display area S (source display area) of the screen to another display area D (destination display area) of the same screen. As described before, color codes representative of colors of display elements on the screen are stored in the consecutive memory locations of the VRAM 4 which begin from the address "0". Therefore, the movement of the image from the source display area S to the destination display area D can be achieved by transferring color codes in memory locations of the VRAM 4 corresponding to the display area S to memory locations of the VRAM 4 corresponding to the display area D. After the completion of the transfer of the color codes, the image data processing circuit 10 performs a display operation for the display area D in accordance with the transferred color codes.

The LMMM command differs from the HMMM command in the following respects:

(i) A transfer of color codes is made on a display element basis or a dot basis in the case of the LMMM command, while a transfer of color codes is made on a byte basis in the case of the HMMM command.

(ii) A logical operation processing of color codes can be performed in the case of the LMMM command, while there is provided no such processing in the case of the HMMM command.

(iii) The processing effected by the image data processing circuit 10 has a higher priority than that effected by the command processing circuit 15 in the case of the LMMM command, whereas the display processing of an animation image by the image data processing circuit 10 is interrupted when the command processing circuit 15 requires any processing of the HMMM command.

The processing of each of the LMMM and HMMM commands will now be described.

LMMM command

In the case where an LMMM command is executed to implement the movement of the image shown in FIG. 11, the VDP 1 first reads a color code corresponding to the display element P1 from the VRAM 4 and then reads a color code corresponding to the display element Q1 from the VRAM 4. The VDP 1 succeedingly carries out a transparency processing or a logical operation on these read color codes and then writes the results into a memory location of the VRAM 4 which corresponds to the display element Q1. And thereafter, a similar operation is repeatedly carried out with respect to each of the pairs of display elements P2 and Q2, display elements P3 and Q3, display elements P4 and Q4, ...

HMMM command

Figure 12:
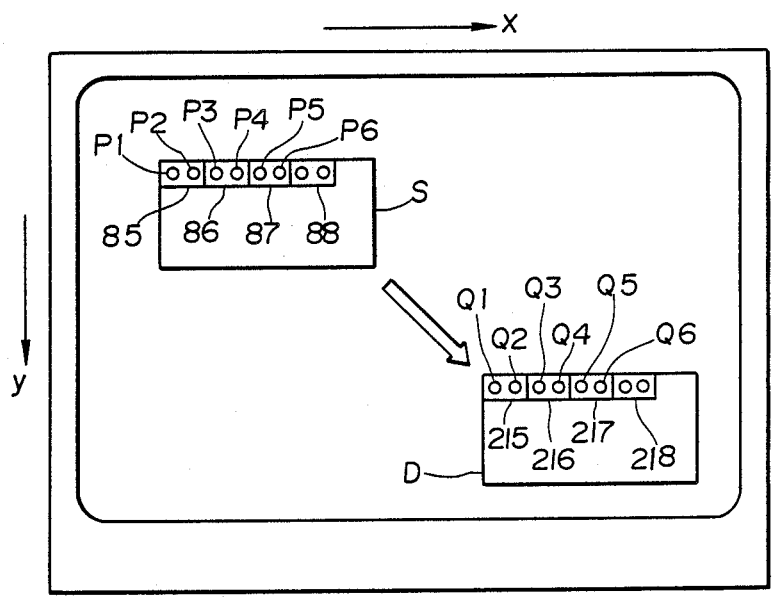
FIG. 12 is an illustration showing transfer of color codes representative of the display image in the source display area to a memory area of the VRAM 4 corresponding to the destination display area in the G IV and G VI modes.
Figure 14A:
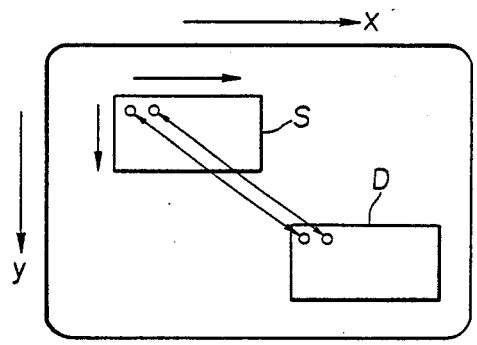
FIG. 14-(a) is an illustration showing the order of transfer of color codes from a memory area corresponding to the source display area to another memory area corresponding to the destination display area when both of the bit data DIRX and DIRY are "0"; .
Figure 14B:
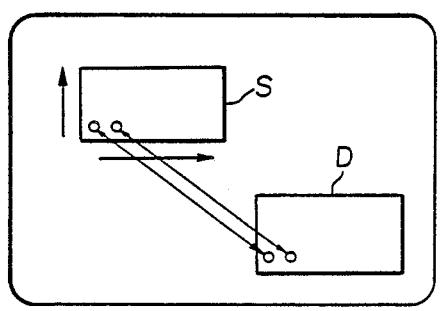
Figure 14C:
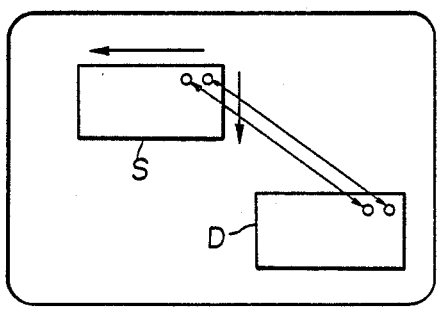
Figure 14D:
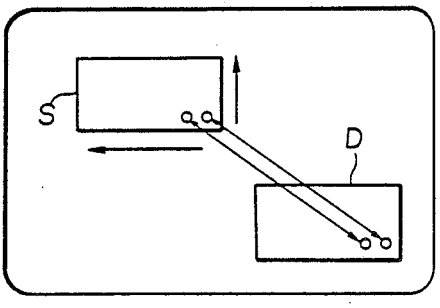

It is assumed that the mode of operation of the VDP 1 is set to the GIV mode and that color codes corresponding to the elements P1 and P2 are stored in the address "85" of the VRAM 4 with color codes corresponding to the display elements P3 and P4, display elements P5 and P6, ... being stored in the addresses "85", "86", ..., respectively, as shown in FIG. 12. It is also assumed that color codes corresponding to the elements Q1 and Q2 are stored in the address "215" of the VRAM 4 with color codes corresponding to the display elements Q3 and Q4, display elements Q5 and Q6, ... being stored in the addresses "216", "217", ..., respectively. In this case, the VDP 1 first reads the color codes in the address "85" of the VRAM 4 and then write the read color codes into the address "215". Then the VDP 1 reads the color codes in the address "86" and writes them into the address "216", and thereafter a similar operation is repeated.

Data processing to be performed in the processing of a command will now be described.

(1) Transparency processing

When color codes corresponding to the source display area S include color codes representative of transparency, the VDP 1 performs this transparency processing by leaving the colors of display elements in the destination display area D, which correspond to those represented by the transparency color codes in the display area S, as they are. The CPU 2 informs the VDP 1 through the lower four bits of the command data whether the transparency processing is necessary.

(2) Logical operation processing

This processing is to effect a logical operation on each bit of color codes corresponding to the source display area S and a respective one of bits of color codes corresponding to the display area D. In this system, any one of AND, OR, EXOR (exclusive OR) and NOT can be selected as the logical operation. The CPU 2 determines whether a logical operation should be effected and which one of the logical operations should be selected through the lower four bits of the command data.

Table 1 shows all of the logical operations provided in this system. In Table 1, SC represents each source color code (color code representative of a color of each of display elements in a source display area S), DC each destination color code, and D a destination area D.

The LOP unit 60 shown in FIG. 9 performs one of the logical operations listed in Table 1 in accordance with the output signal LOPS of the LOP decoder 30 (FIG. 8) and outputs the results of the operation onto the IBUS 57.

TABLE

| Lower four bits of command data | command | processing |
|---|---|---|
| 0000 | IMP | SC → D |
| 0001 | AND | SC * DC → D |
| 0010 | OR | SC + DC → D |
| 0011 | EOR | SC + DC → D |
| 0100 | NOT | SC → D |
| 1000 | TIMP | SC = 0; DC → D<br>SC ≠ 0; IMP |
| 1001 | TAND | SC = 0; DC → D<br>SC ≠ 0; AND |
| 1010 | TOR | SC = 0; DC → D<br>SC ≠ 0; OR |
| 1011 | TEOR | SC = 0; DC → D<br>SC ≠ 0; EOR |
| 1100 | TNOT | SC = 0; DC → D<br>SC ≠ 0; NOT |

(3) Address formation

When it is desired to perform such a movement of display image as shown in FIG. 11, the CPU 2 outputs to the command processing circuit 15 x and y coordinates $(x_a, y_a)$ of the display element P1, x and y coordinates $(x_b, y_b)$ of the display element Q1, the number of display elements $N_x$ of a row of display elements within each of the display areas S and D, and the number of display elements $N_y$ of a column of display elements within each of the display areas S and D. The command processing circuit 15 forms from these data an address data representative of a memory location to be accessed in the following manner:

(3)-1 G IV mode

As is apparent from FIGS. 4-(a) and 4-(c), an address (AD) of the VRAM 4 in which a color code corresponding to the display element P at the coordinates (x, y) of the screen is stored can be calculated by the following equation:

$$AD = (256 * y + x)/2 \qquad (1)$$

Incidentally, the result of a multiplication of binary data by 256 can be obtained by shifting the binary data by eight bits upwardly. Also, the result of a division of binary data by two can be obtained by shifting the binary data by one bit downwardly. From this, it is appreciated that the calculation of the equation (1) can be achieved by shifting binary data representative of the y coordinate by eight bits upwardly, subsequently adding binary data representative of the x coordinate to the shift result, and subsequently shifting the result of this addition by one bit downwardly.

(3)-2 G V mode

As seen from FIGS. 5-(a) and 5-(c), an address (AD) of the VRAM 4, in which a color code corresponding to the display element P at the coordinates (x, y) of the screen is stored, can be calculated by the following equation:

$$AD = (512 * y + x)/4 \qquad (2)$$

The calculation of this equation (2) can be achieved by shifting binary data representative of the y coordinate by nine bits upwardly, subsequently adding binary data representative of the x coordinate to the shift result, and subsequently shifting the result of this addition by two bits downwardly.

(3)-3 G VI mode

As seen from FIGS. 6-(a) and 6-(c), an address (AD) of the VRAM 4, in which a color code corresponding to the display element P at the coordinates (x, y) of the screen is stored, can be calculated by the following equation:

$$AD = (512 * y + x)/2 \qquad (3)$$

The calculation of this equation (3) can be achieved by shifting binary data representative of the y coordinate by nine bits upwardly, subsequently adding binary data representative of the x coordinate to the shift result, and subsequently shifting the result of this addition by one bit downwardly.

(3)-4 G VII mode

As seen from FIGS. 7-(a) and 7-(c), an address (AD) of the VRAM 4, in which a color code corresponding to the display element P at the coordinates (x, y) of the screen is stored, can be calculated by the following equation:

$$AD = 256 * y + x \qquad (4)$$

The calculation of this equation (4) can be achieved by shifting binary data representative of the y coordinate by eight bits upwardly, and subsequently adding binary data representative of the x coordinate to the shift result.

The above address formation is carried out by the address shift register 52 shown in FIG. 9. The address shift register 52 first detects the current display mode and then performs a shift operation in a manner described above in accordance with the detection results.

(4) Data shifting

This data shifting processing is performed only when an LMMM command is selected. For example, the data shift processing in the G V mode (FIG. 5) will now be described.

Figure 13:
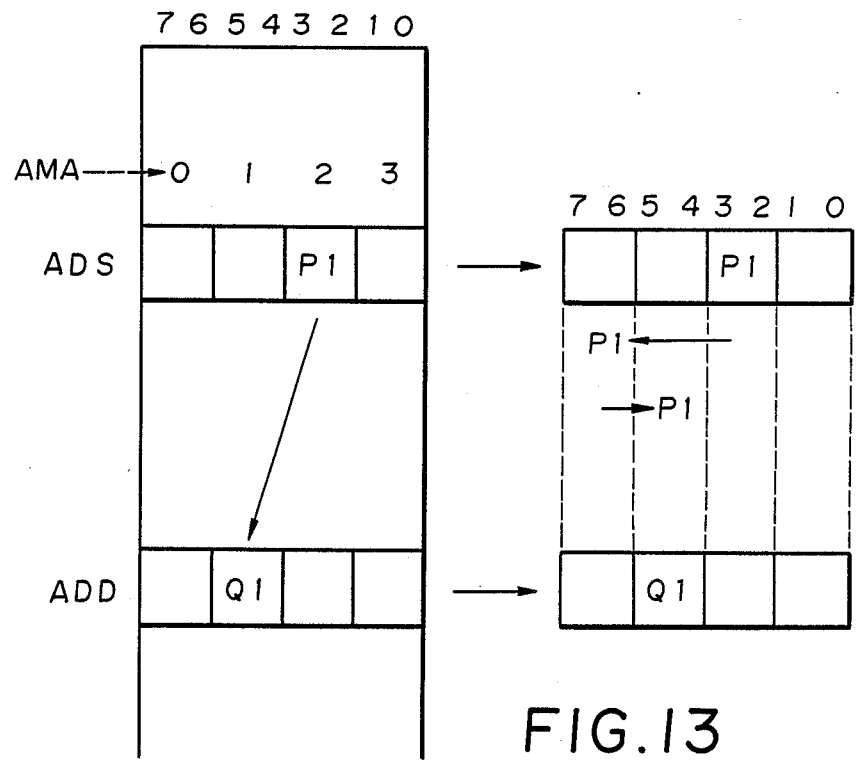
FIG. 13 is an illustration showing one example of data shifting performed by the data shift register 54 of the command processing circuit 15 of FIG. 8 in the G V mode.

It is assumed that the same movement of color codes as that shown in FIG. 11 is now requested. It is also assumed that a color code corresponding to the display element P1 (hereinafter referred to as "color code (P1)") is stored, as shown in FIG. 13, in the third and fourth bits of an address ADS of the VRAM 4 and that a color code corresponding to the display element Q1 (hereinafter referred to as "color code (Q1)") is stored in the fifth and sixth bits of an address ADD of the VRAM 4. When it is required to transfer the color code (P1) to the bit position of the address ADD in which the color code (Q1) is stored, both of the bit positions of the color codes (P1) and (Q1) in the corresponding bytes must coincide with each other. Also when it is required to effect a logical operation on the above two color codes (P1) and (Q1) and to store the result of the operation into the bit position of the address ADD in which the color code (Q1) is stored, both of the bit positions of the color codes (P1) and (Q1) must coincide with each other. And therefore, the color code (P1) should be shifted by two bits upwardly so that the bit position thereof coincides with that of the color code (Q1). The above shift operation is carried out in the following manner:

Each of the bit positions of the color codes (P1) and (Q1) in the corresponding bytes can be determined from the remainder of the division represented by the equation (2) which is effected in the aforesaid address formation processing. The division is effected by shifting the data $(512*y+x)$ by two bits downwardly, and therefore, the remainder is the lowermost two bits of the data $(512*y+x)$, i.e., the lowermost two bits of the x coordinate, which are shifted out when the shift operation is carried out. When the remainder, which is shown at AMA in FIG. 13, represents "0", a color code representative of a color of the current display element is stored in the uppermost two bits of an address of the VRAM 4. When the remainder represents "1", a color code to be processed is located in the fifth and sixth bits of an address of the VRAM 4. Similarly, when the remainder represents "2" and "3", color codes to be processed are located in the third and fourth bits of an address and in the first and second bits of an address, respectively. And therefore, when it is required to transfer the color code (P1) to the bit position of the address ADD in which the color code (Q1) is stored, the color code (P1) is first shifted upwardly by the number of bits which is obtained by multiplying the remainder of the division, effected in the address formation processing with respect to the display element P1, by two. In the case of the color code (P1), the number of bits by which the shift operation is effected is four, since the remainder of the division is two. And therefore, the color code (P1) is shifted upwardly from the third and fourth bits to the uppermost two bits, as shown in FIG. 13. The thus shifted color code (P1) is then shifted downwardly by the number of bits which is obtained by multiplying the remainder of the division, effected in the address formation processing with respect to the display element Q1, by two. In the case of the color code (Q1), the number of bits by which the shift operation is effected is two, since the remainder of the division is one. And therefore, the shifted color code (P1) is again shifted downwardly from the uppermost two bits to the fifth and sixth bits, as shown in FIG. 13. The data shifting processing in the G IV and G VI modes differs from the above data shifting processing only in that remainder of the division effected in the address formation is composed of one bit. In the case of the G VII mode, each address of the VRAM 4 stores only one color code, so that any data shifting processing is not required.

The above-described data shifting processing is carried out by the data shift register 54 shown in FIG. 9. More specifically, the data shift register 54 performs upward and downward shift operations of a color code data read from the VRAM 4 in accordance with the mode data MOD outputted from the mode register 31, the lowermost two bits (or the LSB) of data representative of x coordinate of a display element in the source display area S, and the lowermost two bits (or the LSB) of data representative of x coordinate of a display element in the destination display area D.

(5) Color code selection processing

This processing is performed only when an LMMM command is executed. When it is required to transfer the color code (P1) shown in FIG. 13 to the bit position of the address ADD in which the color code (Q1) is stored, color code data in the address ADS is first read out and is then subjected to the above-mentioned data shifting processing. Then, color code data in the address ADD is read out. The color code (Q1) contained in the color code data read from the address ADD is replaced by the color code (P1) to form a new color code data, and then the new color code data thus obtained is written into the address ADD. As seen from FIG. 13, the first through fourth, seventh and eighth bits of the color code data read from the address ADD and the third and fourth bits of the color code read from the address ADS must be selected to form the new color code data to be written into the address ADD. This color code selection processing is performed by the LOP unit 60 shown in FIG. 9. More specifically, the LOP unit 60 performs the above-described color code selection processing in accordance with the mode data MOD outputted from the mode register 31, the lowermost two bits (or the LSB) of data representative of x coordinate of a display element in the source display area S, and the lowermost two bits (or the LSB) of data representative of x coordinate of a display element in the destination display area D. The results of the color code selection processing is outputted onto the IBUS 57.

(6) Processing based on the argument data ARD

Color codes are sequentially read from and written into each address of the corresponding areas of the VRAM 4 in an order determined by this processing. In the case of the LMMM command, one of four kinds of orders, each of which is described below, is selected.

When the first one of the four orders is selected, as shown in FIG. 14-(a), color codes of display elements on the uppermost row in a source display area S are first sequentially read rightwardly and transferred to the corresponding positions in a destination display area D. And when all of the color codes of the display elements on the uppermost row of the source display area S have been transferred, color codes of display elements on the lower adjacent row of the source display area S are sequentially read rightwardly and transferred to the corresponding positions in the destination display area D. A transfer of the rest of the color codes are thereafter carried out in the same manner.

When the second one of the four orders is selected, as shown in FIG. 14-(b), color codes of display elements on the lowermost row in a source display area S are first sequentially read rightwardly and transferred to the corresponding positions in a destination display area D. When all of the color codes of the display elements on the lowermost row have been transferred, color codes of display elements on the upper adjacent row of the source display area S are sequentially read rightwardly and transferred to the corresponding positions in the destination display area D. And thereafter, transfer of the rest of the color codes are carried out in the same manner.

When the third one of the four orders is selected, as shown in FIG. 14-(c), color codes of display elements on the uppermost row in a source display area S are first sequentially read leftwardly and transferred to the corresponding positions in a destination display area D. And when all of the color codes of the display elements on the uppermost row have been transferred, color codes of display elements on the lower adjacent row of the source display area S are sequentially read leftwardly and transferred to the corresponding positions in the destination display area D. And thereafter, transfer of the rest of the color codes are carried out in the same manner.

When the fourth one of the four orders is selected, as shown in FIG. 14-(d), color codes of display elements on the lowermost row in a source display area S are first sequentially read leftwardly and transferred to the corresponding positions in a destination display area. And when all of the color codes of the display elements on the lowermost row have been transferred, color codes of display elements on the upper adjacent row of the source display area S are sequentially read leftwardly and transferred to the corresponding positions in the destination display area D. And thereafter, transfer of the rest of the color codes are carried out in the same manner.

Figure 8:
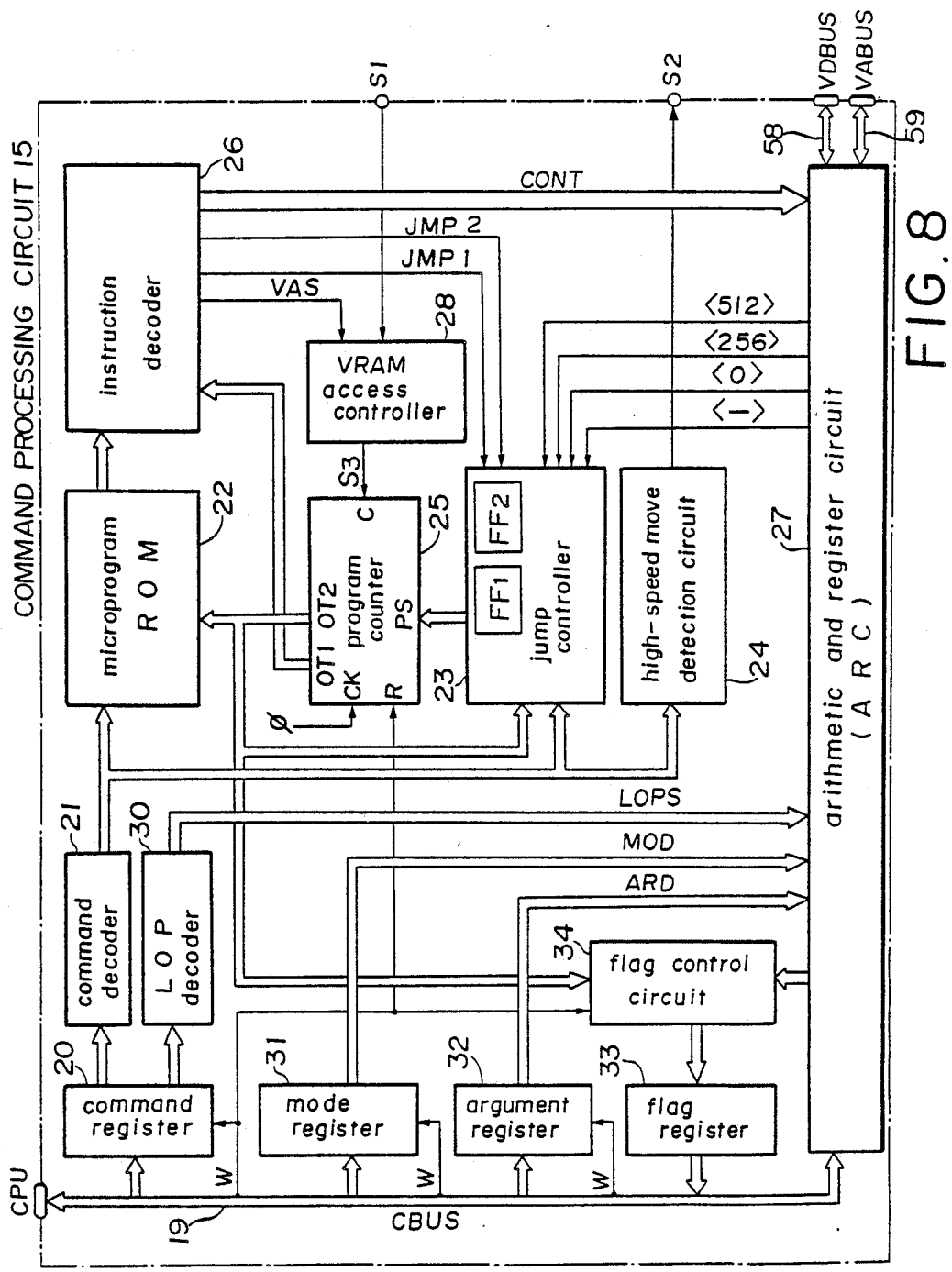
FIG. 8 is a block diagram of the command processing circuit 15 of the video display processor 1 in the video display control system of FIG. 3.

One of the above four orders is selected in accordance with the bit data DIRX and DIRY stored in the argument register 32 (FIG. 8). When the data DIRX and DIRY supplied from the CPU2 to the argument register 32 are "0" and "0", respectively, the order shown in FIG. 14-(a) is selected. Similarly, when the data DIRX and DIRY are "0" and "1" the order shown in FIG. 14-(b) is selected, when "1" and "0" the order shown in FIG. 14-(c), and when "1" and "1" the order shown in FIG. 14-(d).

Figure 15:
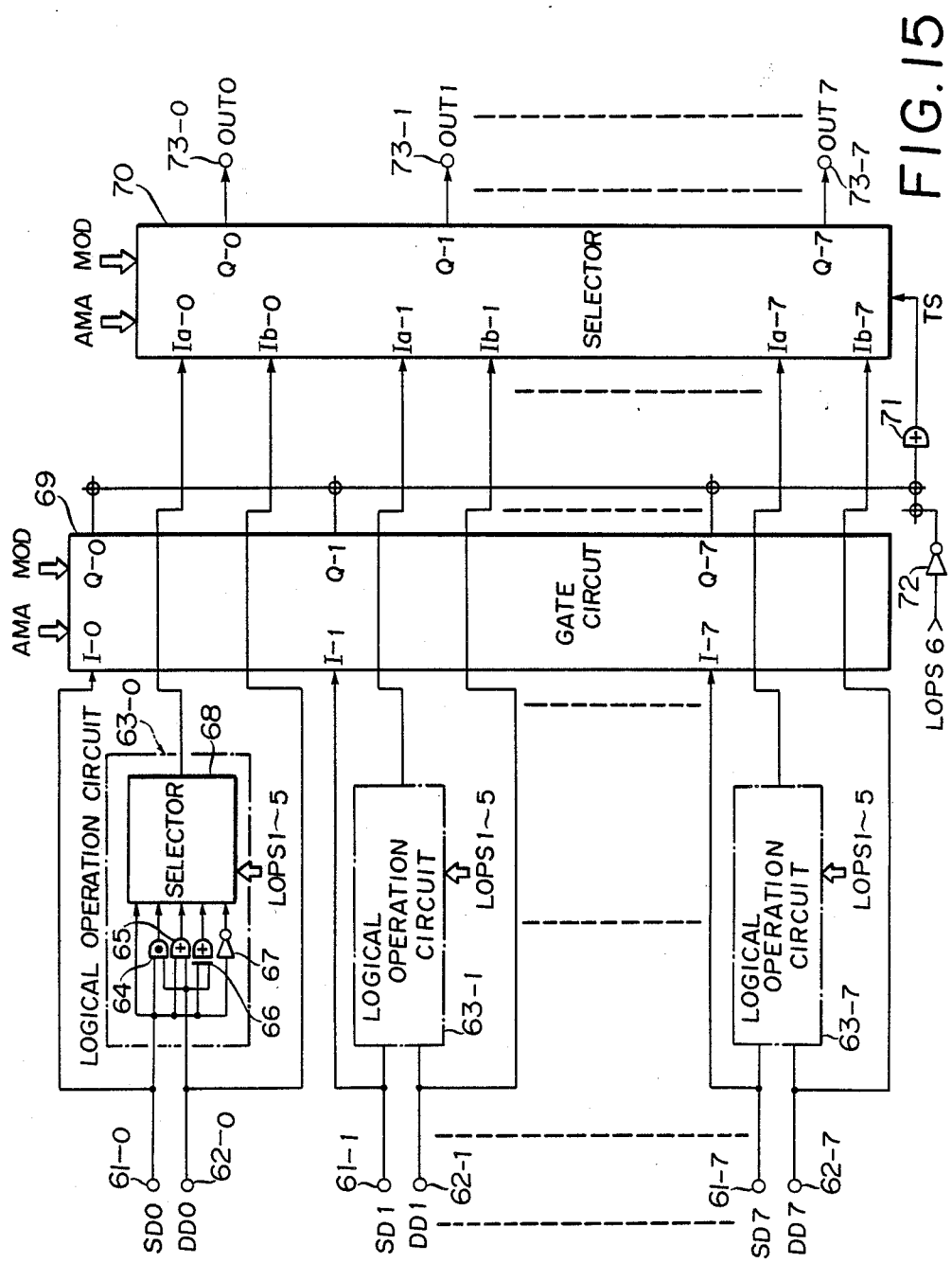
FIG. 15 is a block diagram of the LOP unit 60 of the arithmetic and register circuit 27 of FIG. 9.

The aforesaid transparency processing, logical operation, and color code selection processing are carried out by the LOP unit 60. The construction of this LOP unit 60 will now be more fully described with reference to FIG. 15. The LOP unit 60 has input terminals 61-0 to 61-7 to which the first to eighth bits SD0 to SD7 of a byte of source data is supplied, the source data being read from an address in a memory area of the VRAM 4 corresponding to a source display area and including a color code to be processed or to be transferred to an address in another memory area of the VRAM 4 corresponding to a destination display area. The LOP unit 60 also has input terminals 62-0 to 62-7 to which the first to eighth bits OD0 to OD7 of a byte of destination data is supplied, the destination data being read from an address in a memory area of the VRAM 4 corresponding to a destination display area and including a color code to be processed. The input terminals 61-0 to 61-7 are connected to the IBUS 57 through buffer gates (not shown). Also, the input terminals 62-0 to 62-7 are connected to the VDBUS 58 through buffer gates (not shown). The input terminals 61-0 and 62-0 are connected to a logical operation circuit 63-0 which comprises an AND gate 64 for effecting an AND operation on the bits SD0 and DD0, an OR gate 65 for effecting an OR operation on the bits SD0 and DD0, an exclusive OR gate 66 for effecting an exclusive OR operation on the bits SD0 and DD0, an inverter 67 for inverting the bit SD0, and a selector 68. The selector 68 is supplied at data input terminals thereof with the bit SD0, an output signal of the AND gate 64, an output signal of the OR gate 65, an output signal of the exclusive OR gate 66 and an output signal of the inverter 67. And the selector 68 selects one of the inputted five signals in accordance with signals LOPS1 to LOPS5 applied thereto. The signals LOPS1 to LOPS5 are the first to fifth ones of the signals LOPS outputted from the LOP decoder 30. The signal LOPS1 is rendered "1" when the lower four bits of the command data represent the IMP or TIMP command shown in Table 1, and in response to this signal LOPS1 the selector 68 selects the bit SD0 and outputs it from an output terminal thereof. The signal LOPS2 is rendered "1" when the lower four bits of the command data represent the ANDor TAND command, and in response to this signal LOPS2 the selector 68 selects the output signal of the AND gate 64 and outputs it from the output terminal thereof. The signal LOPS3 is rendered "1" when the lower four bits of the command data represent the OR or TOR command, and in response to this signal LOPS3 the selector 68 selects the output signal of the OR gate 65 and outputs it from the output terminal thereof. The signal LOPS4 is rendered "1" when the lower four bits of the command data represent the EOR or TEOR command, and in response to this signal LOPS4 the selector 68 selects the output signal of the exclusive OR gate 66 and outputs it from the output terminal thereof. The signal LOPS5 is rendered "1" when the lower four bits of the command data represent the NOT or TNOT command, and in response to this signal LOPS5 the selector 68 selects the output signal of the inverter 67 and outputs it from the output terminal thereof. The input terminals SD1 and DD1, SD1 and DD1, ..., and SD7 and DD7 are connected to logical operation circuit 63-1, 63-2, ..., and 63-7, respectively. Each of the logical operation circuit 63-1 to 63-7 has the same construction as that of the logical operation circuit 63-0. Output signals of the logical operation circuit 63-0, 63-1, ... and 63-7 are supplied respectively to input terminals Ia-0, Ia-1, ... and Ia-7 of a selector 70.

The input terminals 61-0, 61-1, ... and 61-7 are also connected respectively to input terminals I-0, I-1, ... and I-7 of a gate circuit 69. This gate circuit 69 is provided for selecting a color code to be processed from the source data in accordance with the mode selection data MOD and the remainder AMA of the division effected in the address formation processing. More specifically, the gate circuit 69 outputs the bits SD0, SD1, ... and SD7 of the source data from its output terminals Q-0, Q-1, ... and Q-7, respectively, when the mode selection data applied thereto represents the G VII mode. In the case of the G IV or G VI mode, the gate circuit 69 selects one of the upper half and the lower half of the source data in accordance with the remainder AMA (one-bit data in this case) and outputs the selected half of the source data (the lower four bits SD0 to SD3 or the upper four bits SD4 to SD7) from the corresponding output terminals thereof. In the G V mode, the gate circuit 69 selects one of the pairs of bits SD0 and SD1, SD2 and SD3, SD4 and SD5, and SD6 and SD7 in accordance with the remainder AMA (two-bit data in this case), and outputs the selected pair of bits from the corresponding output terminals thereof.

The output signals of the gate circuit 69 are supplied to the input terminals of an OR gate 71. The OR gate 71 is also supplied with an output signal of an inverter 72 to which the sixth signal LOPS6 of the signals LOPS is applied. The signal LOPS6 becomes "1" when the lower four bits of the command data represent any one of the TIMP, TAND, TOR, TEOR and TNOT command, i.e., when a transparency processing is requested. The OR gate 71 outputs a signal TS of "0" when the input signals thereof are all "0". In other words, the signal TS is rendered "0" when the color code to be processed is "0" (color code representative of transparency) and when the transparency processing is requested. This signal TS is supplied to the selector 70.

The selector 70 selects, in accordance with the signal TS, the remainder AMA and the mode selection data MOD, one of two groups of input signals applied respectively to input terminals Ia-0 through Ia-7 and Ib-0 through Ib-7 thereof, and outputs the selected group of signals from its output terminals Q-0 through Q-7. More specifically, the selector 70 outputs the signals applied to the input terminals Ib-0 through Ib-7 thereof (the bits DD0 through DD7 of the destination data) from the output terminal Q-0 through Q-7, irrespective of the remainder AMA and the mode selection data MOD, when the signal TS is "0". On the other hand, in the case where the signal TS is "1", the selector 70 effects a selection operation in accordance with the remainder AMA and the mode selection data MOD in the following manner:

When the mode selection data MOD represents the G VII mode, the selector 70 outputs the signals applied to the input terminals Ia-0 through Ia-7 from the output terminals Q-0 through Q-7. When the mode selection data represents the G IV or GVI mode and when the remainder AMA (one-bit data in this case) is "1", the selector 70 outputs the signals applied to the input terminals Ia-0 through Ia-3 from the output terminals Q-0 through Q-3 and also outputs the signals applied to the input terminals Ib-4 through Ib-7 from the output terminals Q-4 through Q-7. When the mode selection data represents the G IV or G VI mode and when the remainder AMA is "0", the selector 70 outputs the signals applied to the input terminals Ib-0 through Ib-3 from the output terminals Q-0 through Q-3 and also outputs the signals applied to the input terminals Ia-4 through Ia-7 from the output terminals Q-4 through Q-7. In the case of the G V mode, the selector 70 outputs the signals applied to the input terminals Ib-0 through Ib-5, Ia-6 and Ia-7 when the remainder AMA (two-bit data in this case) is "0, 0", outputs the signals applied to the input terminals Ib-0 through Ib-3, Ia-4, Ia-5, Ib-6 and Ib-7 when the remainder AMA is "0, 1", outputs the signals applied to the input terminals Ib-0, Ib-1, Ia-2, Ia-3, Ib-4 through Ib-7 when the remainder AMA is "1, 0", and outputs the signals applied to the input terminals Ia-0, Ia-1 and Ib-2 through Ib-7 when the remainder AMA is "1, 1".

Bits OUT0 through OUT7 of the eight-bit data derived respectively from the output terminals Q-0 through Q-7 are outputted onto the IBUS 57 via output terminals 73-0 through 73-7 of this LOP unit 60 and buffer gates (not shown).

The operation of this video display control system when an LMMM and an HMMM command is executed will now be described with reference to a flow chart shown in FIG. 16.

LMMM-command

First, the operation of the video display control system when an LMMM command is executed for effecting the transfer of color codes shown in FIG. 11 in the G IV mode will be described with reference to a flow chart shown in FIG. 16. It is here assumed that the data DIRX and DIRY to be stored in the argument register 32 are "0" and "0".

Figure 16:
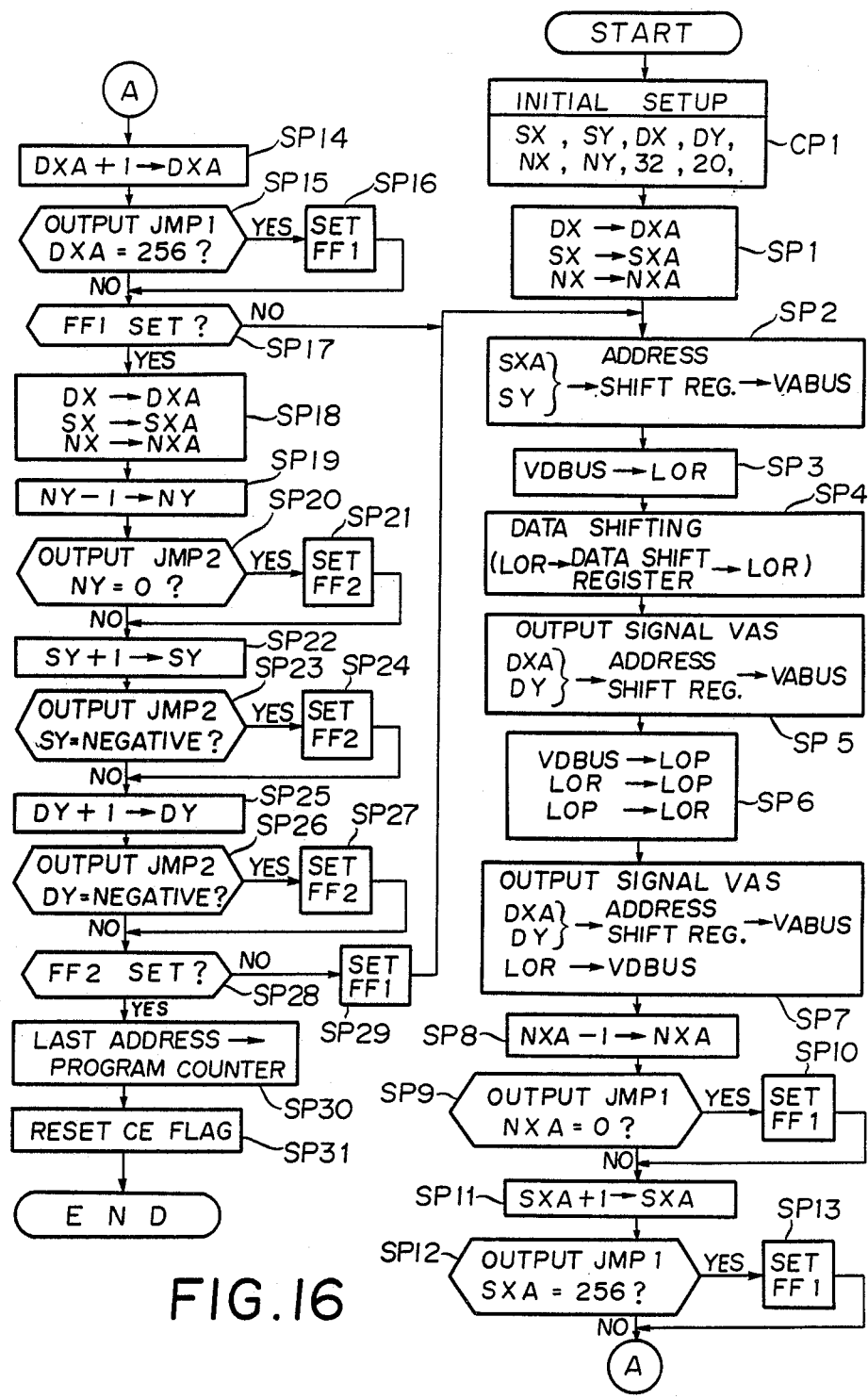
FIG. 16 is a flow chart of the processing carried out by the command processing circuit 15 when an HMMM and an LMMM command is selected.

At block CP1, the CPU 2 stores a pair of data representative of the x-coordinate $x_a$ and y-coordinate $y_a$ of the display element P1 (hereinafter referred to data $(x_a)$ and $(y_a)$) into the SX and SY registers 41 and 42, respectively. The CPU 2 also stores data representative of the x-coordinate $x_b$ and y-coordinate $y_b$ of the display element Q1 (hereinafter referred to data $(x_b)$ and $(y_b)$) into the DX and DY registers 43 and 44, respectively. The CPU 2 further stores data representative of the number of display elements $N_x$ on a row of display elements within each of the source and destination display areas S and D (hereinafter referred to as data $(N_x)$ and $(n_y)$) into the NX and NY registers 45 and 46, respectively. Then, the CPU 2 stores the bit data DIRX and DIRY into the argument register 32 and also stores a command data corresponding to the LMMM command into the command register 20. Incidentally, data representative of the G IV mode has previously been stored in the mode register 31. When outputting the command data, the CPU 2 also outputs a write strobe signal W which is supplied to a load terminal of the command register 20, the flag control circuit 34 and the program counter 25. In response to the write strobe signal W, the flag control circuit 34 sets a CE flag in the flag register 33 to inform the CPU 4 that the VDP 1 is now processing a command. The write strobe signal W also clears the contents of the program counter 25. And thereafter, the program counter 25 counts a clock pulse $\phi$ to produce the count outputs OT1 and OT2. As a result, instructions of the microprogram of the LMMM command is sequentially read out from the ROM 22 in accordance with the count output OT2 and fed to the instruction decoder 26. The instruction decoder 26 decodes each of the instructions and outputs the control signals CONT, VAS, JMP1 and JMP2 in accordance with the results of the decoding. And the processing of the LMMM command is effected in accordance with these control signals in the following manner:

At block SP1 of FIG. 16, the command processing circuit 15 transfers the contents of the SX, DX and NX registers 41, 43 and 45 to the SXA, DXA and NXA registers 47, 48 and 49, respectively. At block SP2, the instruction decoder 26 shown in FIG. 8 outputs the signal VAS to the VRAM access controller 28. In response to the signal VAS, the VRAM access controller 28 determines whether the signal S1 is active. In the case where the signal S1 is outputted from the image data processing circuit 10, i.e., when the image data processing circuit 10 is accessing the VRAM 4, the VRAM access controller 28 outputs the signal S3 to halt the count operation of the program counter 25. As a result, the decoding of the instructions by the instruction decoder 26 is stopped whereby the processing of this command is also stopped. On the other hand, in the case where the signal S1 is not active or when the signal S1 is rendered inactive, the program counter 25 continues or begins the count operation to proceed with the processing of the LMMM command. And the processing proceeds to block SP2. At this block SP2, the command processing circuit 15 outputs the contents of the SXA and SY registers 47 and 42 (the data $(x_a)$ and $(y_a)$) to the address shift register 52. The address shift register 52 forms from the data $(x_a)$ and $(y_a)$ an address data indicative of an address of the VRAM 4 corresponding to the display element P1 in the aforesaid manner and outputs the address data onto the VABUS 59. This address data is then supplied to the VRAM 4 via the interface circuit 11 (FIG. 3) whereupon color code data including a color code corresponding to the display element P1 is read from the VRAM 4 and outputted onto the VDBUS 58. And at the next block SP3, the read color code data on the VDBUS 58 is stored into the LOR register 50. At block SP4, the color code data in the LOR register 50 is supplied to the data shift register 54 to adjust the bit position of the color code corresponding to the display element P1 in the abovedescribed manner, and the thus shifted color code data is again stored into the LOR register 50.

At block SP5, the instruction decoder 26 outputs the signal VAS to determine whether the command processing circuit 15 may access the VRAM 4 at this time. And if it is determined that the command processing circuit 15 may access the VRAM 4, the command processing circuit 15 outputs the contents of the DXA and DY registers 48 and 44, i.e., the data $(x_b)$ and $(y_b)$, through the address shift register 52 onto the VABUS 59. As a result, color code data including a color code corresponding to the display element Q1 is read from the VRAM 4 and outputted onto the VDBUS 58. At the next block SP6, the color code data on the VDBUS 58 and the color code data in the LOR register 50 are supplied to the LOP unit 60, and the output of this LOP unit 60 is stored into the LOR register 50. In this case, a color code selection processing, a transparency processing (if necessary) and a logical operation are effected on the color code corresponding to the display dot P1 and the color code corresponding to the display element Q1 to form a new color code in the aforesaid manner. At block SP7, the instruction decoder 26 outputs the signal VAS to determine whether the command processing circuit 15 may access the VRAM 4 at this time. And if it is determined that the command processing circuit 15 may access the VRAM 4, the command processing circuit 15 outputs the contents of the DXA and DY registers 48 and 44, i.e., the data $(x_b)$ and $(y_b)$, onto the VABUS 59. As a result, the color code data stored in the LOR register 50 and including the new color code is stored in the address of the VRAM 4 which corresponds to the display element Q1.

At block SP8, "1" is subtracted from the contents of the NXA register 49 (the number of display elements on a row of display elements within the display area). More specifically, data in the NXA register 49 is outputted to the addition and subtraction circuit 44 wherein "1" is subtracted from the data, and the result of this subtraction is stored into the NXA register 49. The result of the above subtraction is also supplied to the calculation-result determination circuit 55. At the next block SP9, the instruction decoder 26 outputs the signal JMP1, and in response to this signal JMP1, the jump controller 23 determines whether the detection signal <0> is being outputted from the calculation-result determination circuit 55. If the above determination is "YES", the jump controller 23 sets the flip-flop FF1 at block SP10. The determination of "YES" at this block SP9 indicates that all of the color codes of the current row of the display area have been transferred. On the other hand, if the determination result at the block SP9 is "NO", the processing proceeds to block SP11. At the block SP11, "1" is added to the contents of the SXA register 47 by the addition and subtraction circuit 53, and the result of this addition is stored into the SXA register 47 and is supplied to the calculation-result determination circuit 55. As a result, the contents of the SXA register 47 now represent the x coordinate of the display element P2. Incidentally, if the bit data DIRX is "1", "1" is subtracted from the contents of the SXA register 47 at the block SP11. The determination of whether the addition or the subtraction should be selected at the block SP11 is made by the addition and subtraction circuit 53 in accordance with the bit data DIRX in the argument register 32. At the next block SP12, the instruction decoder 26 again outputs the signal JMP1, and in response to this signal JMP1, the jump controller 23 determines whether the detection signal <256> is being outputted from the calculation-result determination circuit 55. If the above determination is "YES", the jump controller 23 sets the flip-flop FF1 at block SP13. On the other hand, if the determination result at the block SP12 is "NO", the processing proceeds to block SP14.

Figure 17:
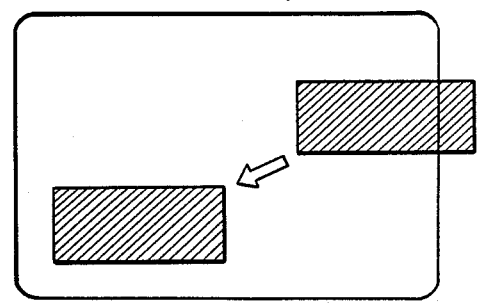
FIG. 17 is an illustration showing movement of a display image in the case where a source display area is illegally designated.

The processing at the block SP12 is performed for the reason described below. When an excessively large number is stored in the NX register 45 by mistake, color codes corresponding to display elements outside the actual display area of the screen can be designated, as shown in FIG. 17. If transfer of these color codes is made, color codes other than those under processing can be destroyed. And therefore, in the GIV mode, if the contents of the SXA register 47 become equal to "256", the flip-flop FF1 is set to terminate the transfer of color codes corresponding to the display elements on the current row in the display area. Similarly, in the G V mode, the flip-flop FF1 is set when the contents of the SXA register 47 become equal to "512". And in the case where the bit data DIRX is "1", the flip-flop FF1 is set when the contents of the SXA register 47 become negative.

At block SP14, "1" is added to the contents of the DXA register 49, and the result of this addition, i.e., x coordinate of the display element Q2, is supplied to the calculation-result determination circuit 55. At the next block SP15, the instruction decoder 26 again outputs the signal JMP1, and in response to this signal JMP1, the jump controller 23 determines whether the detection signal <256> is being outputted from the calculation-result determination circuit 55. If the above determination is "YES", the jump controller 23 sets the flip-flop FF1 at block SP16. On the other hand, if the determination result at the block SP15 is "NO", the processing proceeds to block SP17. The processing at the block 15 has the same effect as that of the processing at the block SP12. At the block SP17, a determination of whether the flip-flop FF1 is in a set state is made by the jump controller 23. And if the determination result is "NO", the jump controller 23 produces a jump-to address data in accordance with the output of the command decoder 21 and the output of the count output OT2 of the program counter 25 (in this case the jump-to address data indicates the address corresponding to the block SP2), and supplies this jump-to address data to the data preset terminal PS of the program counter 25. As a result, the processing returns to the block SP2. And thereafter, the processings of the blocks 2 to 17 are repeated to thereby sequentially transfer the color codes corresponding to the display elements P2, P3, . . .

When transfer of color codes equal in number to "Nx" is completed, i.e., when color codes corresponding to all the display elements on the first row within the display area S have been transferred, the determination result at the block SP9 becomes "YES", so that the flip-flop FF1 is set at the block SP10. As a result, the determination result at the block SP17 also becomes "YES", so that the processing proceeds to the next block SP18. At this block SP18, the data in the DX, SX and NX registers 43, 41 and 45 are again stored into the DXA, SXA and NXA registers 48, 47 and 49, respectively. At the next block SP19, "1" is subtracted from the contents of the NY register 46 at the addition and subtraction circuit 53, and the result of this subtraction is stored into the NY register 46 and is also supplied to the calculation-result determination circuit 55. At the next block SP20, the instruction decoder 26 outputs the signal JMP2, and in response to this signal JMP2, the jump controller 23 determines whether the detection signal <0> is being outputted from the calculation-result determination circuit 55. If the above determination is "YES", the jump controller 23 sets the flip-flop FF2 at block SP21. On the other hand, if the determination result at the block SP20 is "NO", the processing proceeds to block SP22. At this block SP22, "1" is added to the data in the SY register 42 (the y coordinate of the display element P1), and the result of this addition (y coordinate of the display element Pm) is stored into the SY register 42 and is also supplied to the calculation-result determination circuit 55. Incidentally, if the bit data DIRY is "1", "1" is subtracted from the data in the SY register 42 at this block SP22. At the next block SP23, the instruction decoder 26 again outputs the signal JMP2, and in response to this signal JMP2, the jump controller 23 determines whether the detection signal <-> is being outputted from the calculation-result determination circuit 55. If the result of above determination is "YES", the jump controller 23 sets the flip-flop FF2 at block SP24. On the other hand, if the determination result at the block SP23 is "NO", the processing proceeds to block SP25. The processing at the block SP23 has the same effect as that of the processing at the block SP12 and is effective only when the bit data DIRY is "1".

At block SP25, the addition and subtraction circuit 53 adds "1" to the data read from the DY register 44 and stores the addition result (the y coordinate of the display element Qm shown in FIG. 11) into the DY register 44. This addition result is also supplied to the calculation-result determination circuit 55. If the bit data DIRY is "1", the data in the DY register 44 is decremented by one at this block SP25. At the next block SP26, the instruction decoder 26 again outputs the signal JMP2, and in response to this signal JMP2, the jump controller 23 determines whether the detection signal <-> is being outputted from the calculation-result determination circuit 55. If the result of above determination is "YES", the jump controller 23 sets the flip-flop FF2 at block SP27. On the other hand, if the determination result at the block SP26 is "NO", the processing proceeds to block SP28. At this block SP28, a determination of whether the flip-flop FF2 is in a set state is made by the jump controller 23. And if the determination result is "NO", the jump controller 23 resets the flip-flop FF1 at block SP29. At the same time, the jump controller 23 produces a jump-to address data indicative of the address corresponding to the block SP2, and supplies this jump-to address data to the data preset terminal PS of the program counter 25. As a result, the processing returns to the block SP2.

The processing of the blocks 2 to 17 are thereafter repeatedly carried out to thereby sequentially transfer the color codes corresponding to the display elements on the second row in the display area S. When the transfer of color codes of all the display elements on the second row is completed, the proceeding of the blocks 18 through 29 are again carried out. Then, the processing again returns to the block SP2 to begin the transfer of color codes corresponding to the display elements on the third row. And thereafter, processing similar to the above is repeatedly carried out.

When the transfer of the color codes corresponding to all the display elements in the display area S is completed, the determination result at the block SP20 becomes "YES", so that the flip-flop FF2 is brought into a set state at the block SP21. As a result, the determination result at the block SP28 becomes "YES", so that the processing proceeds to the block SP30. At the block SP30, the jump controller 23 outputs data indicative of the last address of the microprogram under processing to the program counter 25. Then, the flag control circuit 34 resets the flag CE in the flag register 33 at block SP31. The above is the processing of the LMMM command.

HMMM command

The processing of an HMMM command will now be described.

The processing of an HMMM command is identical to that of an LMMM command shown in FIG. 16 except that the processing proceeds from the block SP3 to the block SP7 without performing the processings of the blocks SP4 through SP6. Furthermore, the processings at the blocks SP8, SP11 and SP14 are changed as follows:

(a) Block SP8

In the case of the LMMM command, the contents of the NXA register 49 are decremented by one irrespective of the display mode at this block, whereas in the case of an HMMM command the contents of the NXA register 49 are decremented by one in the GVII mode, decremented by two in the GIV and GVI modes, and decremented by four in the G V mode. The reason for this is that, in the case of an HMMM command, transfer of color codes is performed on a byte basis. More specifically, in the case of an HMMM command, two color codes are simultaneously transferred in the G IV and G VI modes, four color codes in the G V mode, and four color codes in the G VII mode.

(b) Block SP11

In the case of the LMMM command, the contents of the SXA register 47 are incremented or decremented by one irrespective of the display mode at this block, whereas in the case of an HMMM command the contents of the NXA register 49 are incremented or decremented by one in the G VII mode, incremented or decremented by two in the G IV and G VI modes, and incremented or decremented by four in the G V mode. The reason for this is the same as that for the processing at the block SP8.

(c) Block SP14

In the case of the LMMM command, the contents of the DXA register 48 are incremented or decremented by one irrespective of the display mode at this block, whereas in the case of an HMMM command the contents of the DXA register 48 are incremented or decremented by one in the G VII mode, incremented or decremented by two in the G IV and G VI modes, and incremented or decremented by four in the G V mode.

Figure 19:
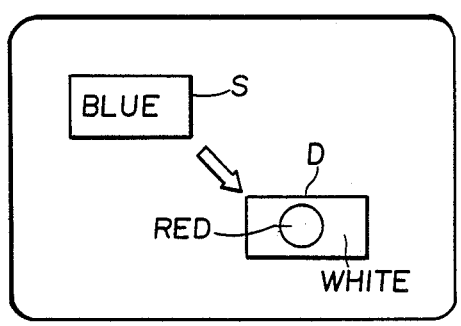
FIG. 19 is an illustration showing movement of a display image with a logical operation on the color codes.
Figure 18:
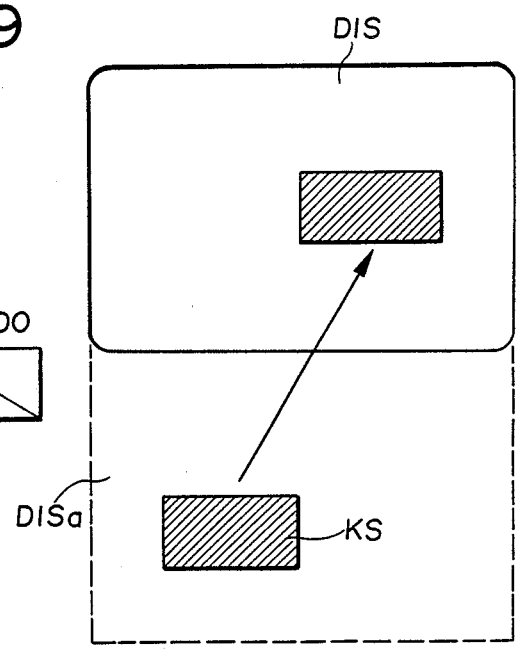
FIG. 18 is an illustration showing movement of a display image from a source display area located on an imaginary display screen to a destination display area located on the actual screen.

In the above description, a display image has been moved from a display area to another, within the screen of the video display unit. With the system described above, data representative of an image can also be moved from a memory area corresponding to a display area within the screen to another memory area corresponding to an imaginary display area outside the screen. In the G IV mode, for example, a memory area having a capacity equal to that of the data area 4a (FIG. 4-(b)) is provided in the VRAM 4 as the additional data area 4b. The additional data area 4b of such a capacity provides an imaginary screen DISa disposed below the actual screen DIS, as shown in FIG. 18. The aforesaid HMMM and LMMM commands can move a display image from an imaginary display area within the imaginary screen DISa to a display area within the actual display screen DIS, and vice versa. And therefore, a display image whose color codes have been stored in a memory area corresponding to an imaginary display area KS on the imaginary screen DISa can be displayed at any position on the actual screen DIS by executing the LMMM or HMMM command. In this case, an image on the actual screen DIS can also temporarily be saved in the additional data area 4b which corresponds to the imaginary display screen DISa. Thus, with the structure of the above system, a variety of still images can be displayed in a variety of manners. For example, a certain pattern such as a pattern of an airplane can be superimposed in a still image on the screen DIS by providing an image including the pattern of the airplane in the imaginary display area KS on the imaginary display screen DISa in such a manner that the portion of the display area KS other than the airplane is filled with color codes representative of transparency, and moving this image to a desired display area on the actual display screen DIS. Also, with the structure of the above system, a color or colors of a display image can be change without altering the pattern thereof. Assuming that there is displayed in the destination display area D of the screen a rectangular image of, for example, white including a circular area of, for example, red as shown in FIG. 19, the colors of the rectangular image in the destination display area D can be changed without altering the pattern of the image by performing together with the logical operation processing (such as AND and EXOR) a movement of a rectangular pattern of, for example, blue in the source display area S of the same size to the destination area D.

As described above, with the construction of the above system a movement of an image can be achieved in a rapid manner without the aid of the CPU 2.

Figure 20:
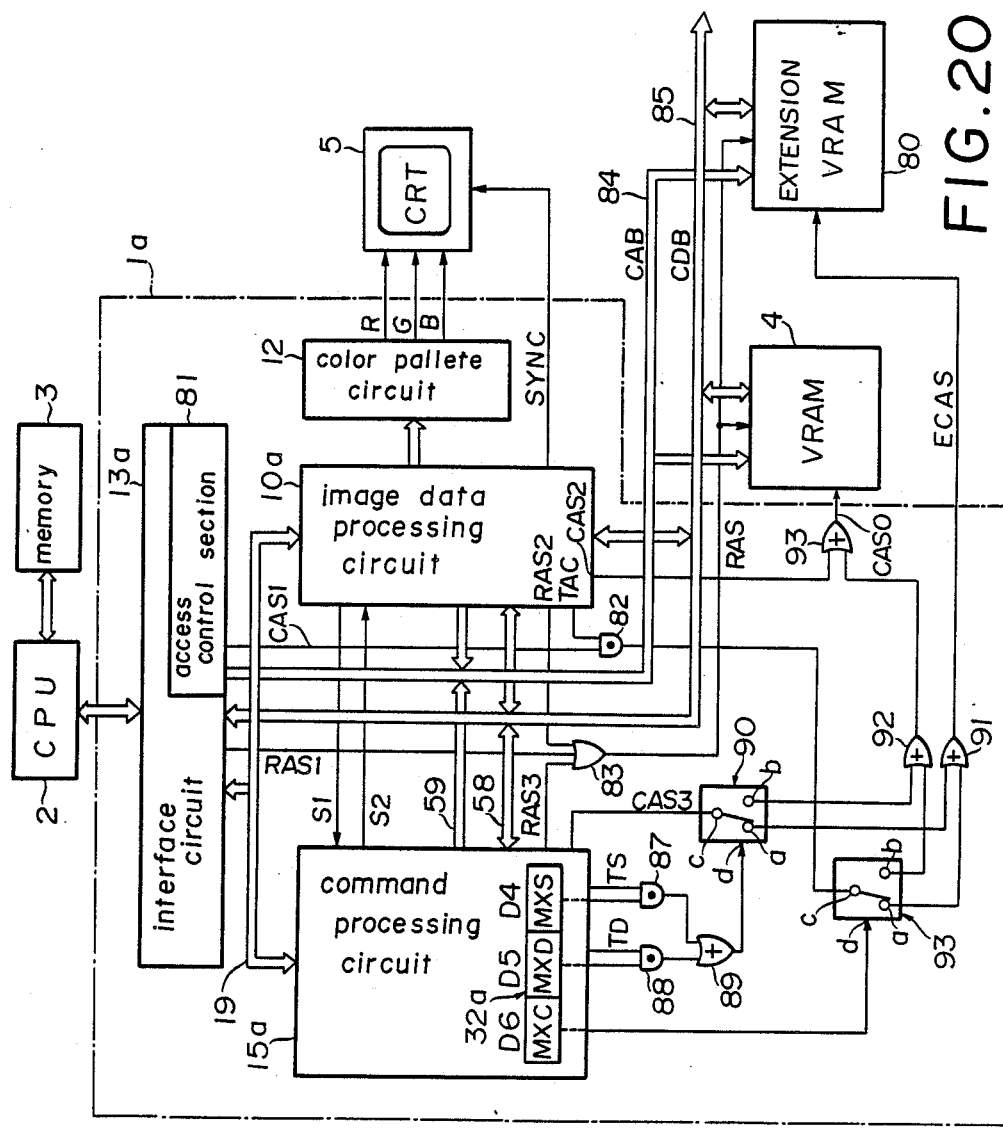
FIG. 20 is a block diagram of a modified video display control system.

FIG. 20 shows a modified video display control system provided in accordance with another embodiment of the present invention which differs from the aforesaid embodiment in the following respects:

As shown in FIG. 20, this video display control system further comprises an extension VRAM 80 which is for example a 64K byte memory. Each of the VRAM 4 and the extension VRAM 80 is of the conventional type of which address is accessed by row and column address data supplied thereto. More specifically, an address of the VRAM 4 and the extension VRAM 80 can be accessed by first supplying thereto a row address (row portion of an address data indicative of the address) with a row address strobe signal and then supplying a column address (column portion of the address data) with a column address strobe signal. An image data processing circuit 10a in a VDP 1a outputs a signal S1 when the image data processing circuit 10a is performing an access to the VRAM 4 or when the CPU 2 is performing an access to either one of the VRAM 4 or the extension VRAM 80. In the accessing operation to the VRAM 4 or the extension VRAM 80, the image data processing circuit 10a has the highest priority, the CPU 2 has the second highest priority, and the command processing circuit 15a has the lowest priority. The image data processing circuit 10a outputs a signal TAC at a specific timing to allow the CPU 2 to access the VRAM 4 and the extension VRAM 80 when it does not perform an access to the VRAM 4 and the extension VRAM 80. The image data processing circuit 10a can make an access only to the VRAM 4, while the CPU 2 and the command processing circuit 15a can make an access to either of the VRAM 4 or the extension VRAM 80. When the CPU 2 performs a direct access to the VRAM 4 and the extension VRAM 80, it stores row and column address data indicative of an address to be accessed into an access control section 81 which is provided in an interface circuit 13a. The access control section 81 outputs the row and column address data together with a row address strobe signal RAS1 and a column address strobe signal CAS1. And then, the CPU 2 performs transfer of data with the accessed address through the interface circuit 13a. The column strobe signal CAS1 is supplied to one input terminal of an AND gate 82 the other input terminal of which is supplied with the signal TAC outputted from the image data processing circuit 10a. On the other hand, the row address strobe signal RAS1 is subjected to a logical OR operation with row address strobe signals RAS2 and RAS3, outputted respectively from the image data processing circuit 10a and the command processing circuit 15a, at an OR gate 83 to form a row address strobe signal RAS which is directly supplied to both of the VRAM 4 and the extension VRAM 80. The row and column address data outputted from the access control section 81 of the interface circuit 13a are supplied to the VRAM 4 and the extension VRAM 80 via common address bus (CAB) 84, while the data outputted from the interface circuit 13a is supplied to the VRAM 4 and the extension VRAM 80 via common data bus (CDB) 85. The VDBUS 58 of the command processing circuit 15a is connected to the CDB 85, and the VABUS 59 is connected to the CAB 84.

Figure 22:
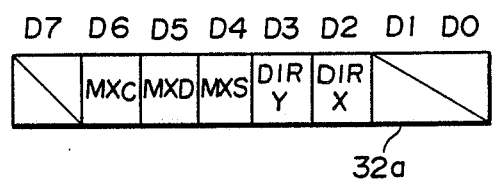
FIG. 22 is an illustration showing bit data DIRX, DIRY, MXS, MXD and MXC stored in the argument register 32a of the command processing circuit 15a of FIG. 21.
Figure 21:
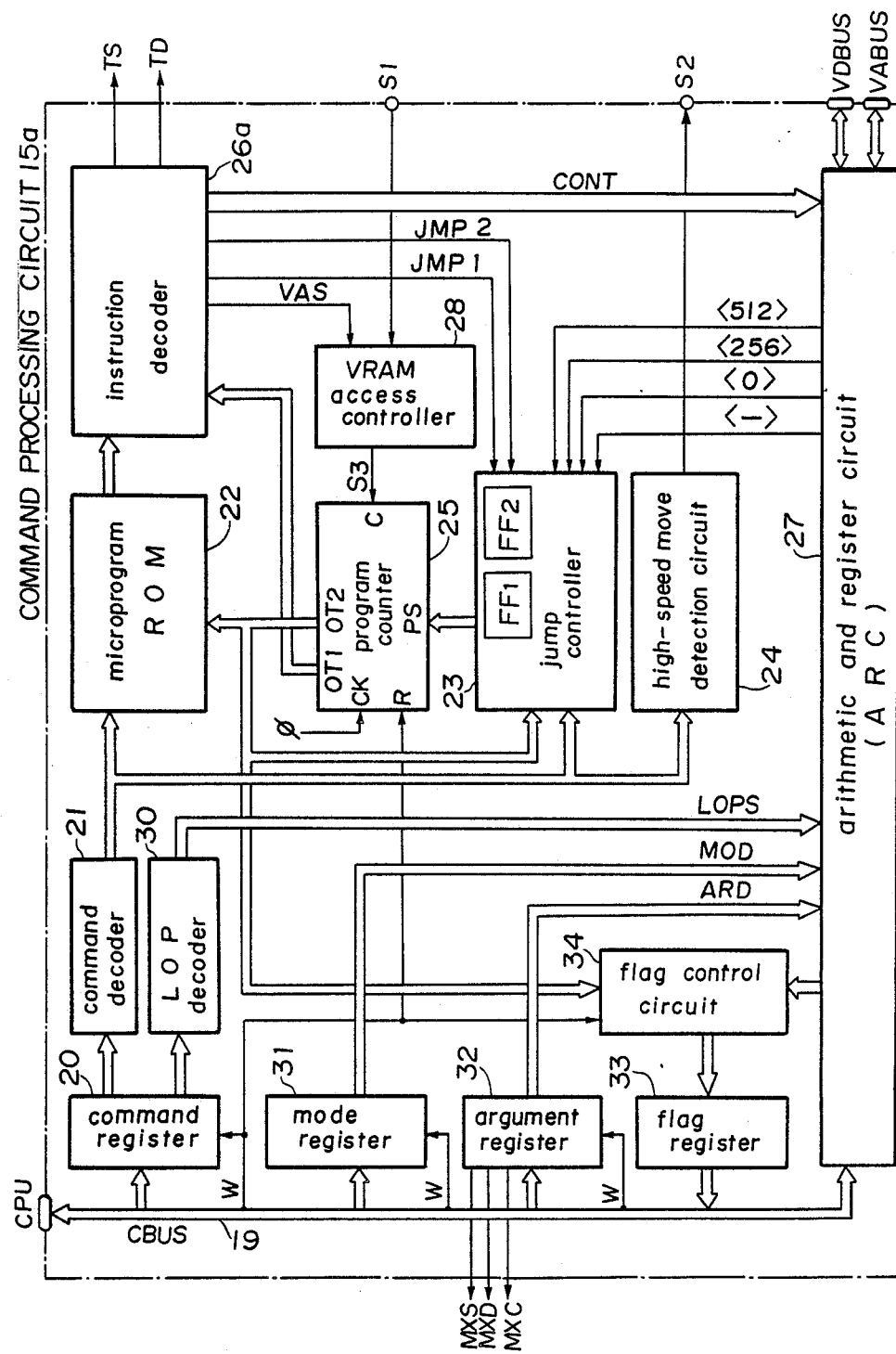
FIG. 21 is a block diagram of the command processing circuit 15a of the VDP 1a of the modified video display control system of FIG. 20.
Figure 23B:
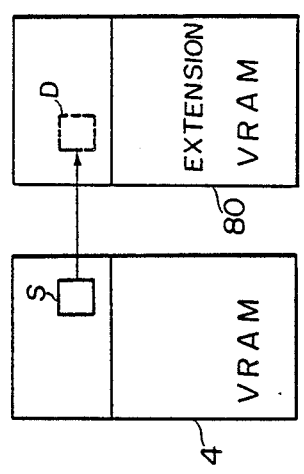
FIG. 23-(a) is an illustration showing movement of a display image composed of Nx X Ny display elements from a source display area to a destination display area which is effected when both of the bit data MXS and MXD are "0"
Figure 23A:
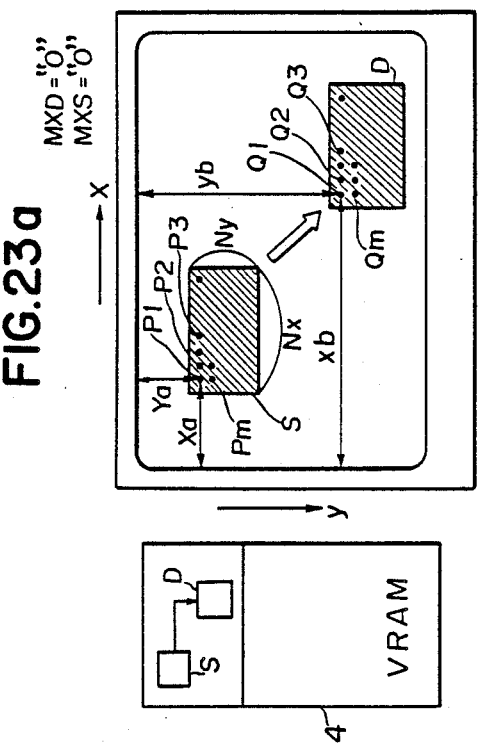
Figure 23D:
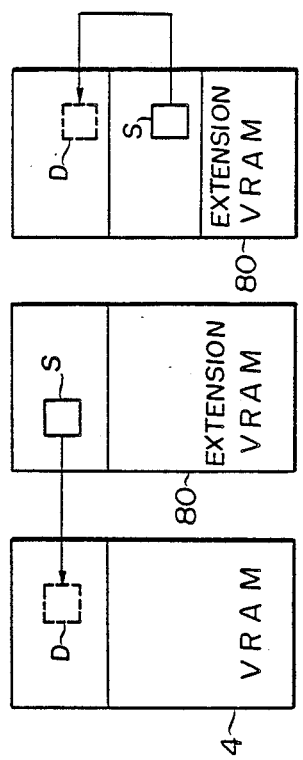
Figure 23C:
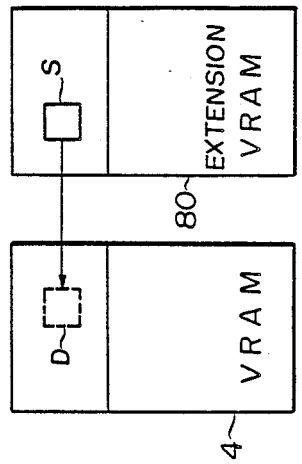

An instruction decoder 26a of the command processing circuit 15a shown in FIG. 21 outputs, in addition to the control signals VAS, JMP1, JMP2 and CONT, control signals TS and TD. The fifth bit D4, sixth bit D5 and seventh bit D6 of an argument register 32a of the command processing circuit 15a are used for storing bit data MXS, MXD and MXC, respectively, as shown in FIG. 22. Output signals of the fifth bit D4 and sixth bit D5 of the argument register 32a are supplied to one input terminals of AND gates 87 and 88 (FIG. 20), respectively. The other input terminals of the AND gates 87 and 88 are supplied with the control signals TS and TD, respectively. Output signals of the AND gates 87 and 88 are fed to input terminals of an OR gate 89, and an output signal of this OR gate 89 is fed to a switching control terminal d of a switch circuit 90. This switch circuit 90 connects an input terminal c thereof to its output terminal a when "1" signal is applied to the control terminal d, and connects the input terminal c to another output terminal b thereof when "0" signal is applied to the control terminal d. The output terminals a and b are connected to one input terminals of OR gates 91 and 92, respectively. An output signal of the seventh bit D6 of the argument register 32a is supplied to a switching control terminal d of another switch circuit 93 of the same type as that of the switch circuit 90. An input terminal c of this switch circuit 93 is supplied with an output signal of the AND gate 82, and output terminals a and b of this switch circuit 93 are connected to the other input terminals of the OR gates 91 and 92, respectively. An output signal ECAS of the OR gate 91 is supplied to the extension VRAM 80 as a column address strobe signal thereof. An output signal of the OR gate 92 is supplied to one input terminal of an OR gate 93 to the other input terminal of which the column strobe signal CAS2 outputted from the image data processing circuit 10a is supplied. An output signal CAS0 of this OR gate 93 is supplied to the VRAM 4 as a column strobe signal thereof.

In this modified system, when it is required to transfer a display image from a source display area S to a destination display area D, the bit data MXS and MXD must be set to "0" and "0", respectively, if memory areas corresponding to the source and destination display areas S and D are located in the VRAM 4, as shown in FIG. 23-(a). If the memory area corresponding to the source display area S is located in the VRAM 4 but if the memory area corresponding to the destination display area D is located in the extension VRAM 80, as shown in FIG. 23-(b), the bit data MXS and MXD are set to "0" and "1", respectively. Similarly, If the memory area corresponding to the destination display area D is located in the VRAM 4 but if the memory area corresponding to the source display area S is located in the extension VRAM 80, as shown in FIG. 23-(c), the bit data MXS and MXD are set to "1" and "0", respectively. And if both of the memory areas corresponding to the source and destination display areas S and D are located in the extension VRAM 80, as shown in FIG. 23-(d), the bit data MXS and MXD are set to "1" and "1", respectively.

When the instruction decoder 26a (FIG. 21) decodes an instruction requiring an access to an address of the VRAM 4 or of the extension VRAM 80, which corresponds to a display element in a source display area S, the instruction decoder 26a outputs the control signal TS. On the other hand, when the instruction decoder 26a decodes an instruction requiring an access to an address of the VRAM 4 or of the extension VRAM 80, which corresponds to a display element in a destination display area D, the instruction decoder 26a outputs the control signal TD. And therefore, in the case where the bit data MXS is in a "1" state when the instruction decoder 26a of the command processing circuit 15a outputs the control signal TS to access a memory location corresponding to a display element in a source display area S, "1" signal is applied to the switching control terminal d of the switch circuit 90 (FIG. 20), so that the column strobe signal CAS3 outputted from the command processing circuit 15a is supplied through the switch circuit 90 and the OR gate 91 to the extension VRAM 80 as the column strobe signal ECAS. And in the case where the bit data MXS is in a "0" state when the instruction decoder 26a outputs the control signal TS, "0" signal is applied to the switching control terminal d of the switch circuit 90, so that the column strobe signal CAS3 is supplied through the switch circuit 90 and the OR gates 92 and 93 to the VRAM 4 as the column strobe signal CAS0. Similarly, in the case where the bit data MXD is in a "1" state when the instruction decoder 26a outputs the control signal TD to access a memory location corresponding to a display element in the destination display area D, "1" signal is applied to the switching control terminal d of the switch circuit 90, so that the column strobe signal CAS3 is supplied to the extension VRAM 80 as the column strobe signal ECAS. And in the case where the bit data MXD is in a "0" state when the instruction decoder 26a outputs the control signal TD, "0" signal is applied to the switching control terminal d of the switch circuit 90, so that the column strobe signal CAS3 is supplied to the VRAM 4 as the column strobe signal CAS0. Thus, when both of the bit data MXS and MXD are "0", color codes are transferred in a manner shown in FIG. 23-(a), and when the bit data MXS and MXD are "0" and "1", respectively, color codes are transferred in a manner shown in FIG. 23-(b). Similarly, when the bit data MXS and MXD are "1" and "0", respectively, color codes are transferred in a manner shown in FIG. 23-(c), and when both of the bit data MXS and MXD are "1", color codes are transferred in a manner shown in FIG. 23-(d).

The bit data MXC is effective only when the CPU 2 performs a direct access to the VRAM 4 or to the extension VRAM 80, i.e., when the CPU 2 performs an access to the VRAM 4 or to the extension VRAM 80 without the aid of the command processing circuit 15a. In the case of the direct access of the CPU 2 to the VRAM 4 or to the extension VRAM 80, the access control section 81 of the interface circuit 13a outputs the column strobe signal CAS1. This signal CAS1 is supplied to the input terminal c of the switch circuit 93 if the signal TAC is "1". And therefore, in the case where the bit data MXC is in a "1" state, the signal CAS1 thus supplied to the input terminal c of the switch circuit 93 is fed through the switch circuit 93 and the OR gate 91 to the extension VRAM 80 as the column strobe signal ECAS. On the other hand, in the case where the bit data MXC is in a "0" state, the signal CAS1 is fed through the switch circuit 93 and the OR gates 92 and 93 to the VRAM 4 as the column strobe signal CAS0. Thus the CPU 2 can selectively access to the VRAM 4 and to the extension VRAM 80 in accordance with the state of the bit data MXC.

The operation of this modified video display control system when an LMMM command is executed differs from that shown in FIG. 16 in the following respects:

At the block CP1, the CPU 2 further stores the bit data MXS and MXD into the argument register 32a. When outputting an address data indicative of an address in a memory area corresponding to the source display area S onto the VABUS 59 at the block SP2, the command processing circuit 15a outputs the control signal TS. And therefore, at the next block SP3 color code data read from an address of the VRAM 4 is stored into the LOR register 50 when the bit data MXS is "0". When the bit data MXS is "1", color code data read from an address of the extension VRAM 80 is stored into the LOR register 50 at this block SP3. At the block SP5, the command processing circuit 15a outputs the control signal TD. And therefore, at the next block SP6 color code data read from an address in a memory area of the VRAM 4, which corresponds to the destination display area D, is supplied to the LOP unit 60 when the bit data MXD is "0". When the bit data MXD is "1", color code data read from an address of the extension VRAM 80 is supplied to the LOP unit 60 at this block SP6. At the block SP7, the command processing circuit 15a outputs the control signal TD. And therefore, at this block SP7 color code data in the LOR register 50 is written into an address in a memory area of the VRAM 4, which corresponds to the destination display area D, when the bit data MXD is "0". When the bit data MXD is "1", the color code in the LOR register 50 is written into an address of the extension VRAM 80.

The operation of this modified system when an HMMM command is executed is almost identical with that of the aforesaid system and differs only in the following respects:

At the block CP1, the CPU 2 further stores the bit data MXS and MXD into the argument register 32a. At the block SP2, the command processing circuit 15a outputs the control signal TS. And therefore, at the next block SP3 color code data is read from the VRAM 4 or from the extension VRAM 80 in accordance with the state of the bit data MXS and is stored into the LOR register 50. At the block SP7, the command processing circuit 15a outputs the control signal TD. And therefore, at this block SP7 color code data in the LOR register 50 is written into the VRAM 4 or into the extension VRAM 80 in accordance with the state of the bit data MXD.

This modified system can also process a command for transferring color codes outputted from the CPU 2 to the VRAM 4 or to the extension VRAM 80, a command for transferring a color code in the VDP 1 (in the LOR register 50) to the VRAM 4 or to the extension VRAM 80, and a command for transferring color codes from the VRAM 4 or from the extension VRAM 80 to the CPU 2. In the case of the transfer of color codes from the CPU 2 (or of a color code form the VDP 1a) to the VRAM 4 or to the extension VRAM 80, the color codes are written into the VRAM 4 when the bit data MXD is "0", and the color codes are written into the extension VRAM 80 when the bit data MXD is "1". In the case of the transfer of color codes from the VRAM 4 (or from the extension VRAM 80) to the CPU 2, the color codes are read from the VRAM 4 when the bit data MXS is "0", and the color codes are read from the extension VRAM 80 when the bit data MXS is "1". Thus, by properly selecting the states of the bit data MXS and MXD, any one of the VRAM 4 and the extension VRAM 80 can be selected as the source display area or the destination display area.

The extension VRAM 80 may be replaced by other memory devices such as a read only memory (ROM), in which specific display patterns are stored in advance, and a RAM, in which display patterns fed from an external storage unit such as a floppy disc are stored in advance, to facilitate the processing of the display patterns. The above replacement is particularly useful when a still image is to be displayed in a dot-map mode in which each display element on the screen is displayed in accordance with a respective one of color codes stored in a video memory. Thus, desired display patterns can be displayed on the screen by previously storing color codes of the desired display pattern in a memory area of the memory device, by designating the memory area of the memory device as the source data area, and then transferring the color codes to the VRAM 4.

The CPU 2 can also directly access the VRAM 4 or the extension VRAM 80 by setting the bit data MXC to "1", as described below.

Figure 24:
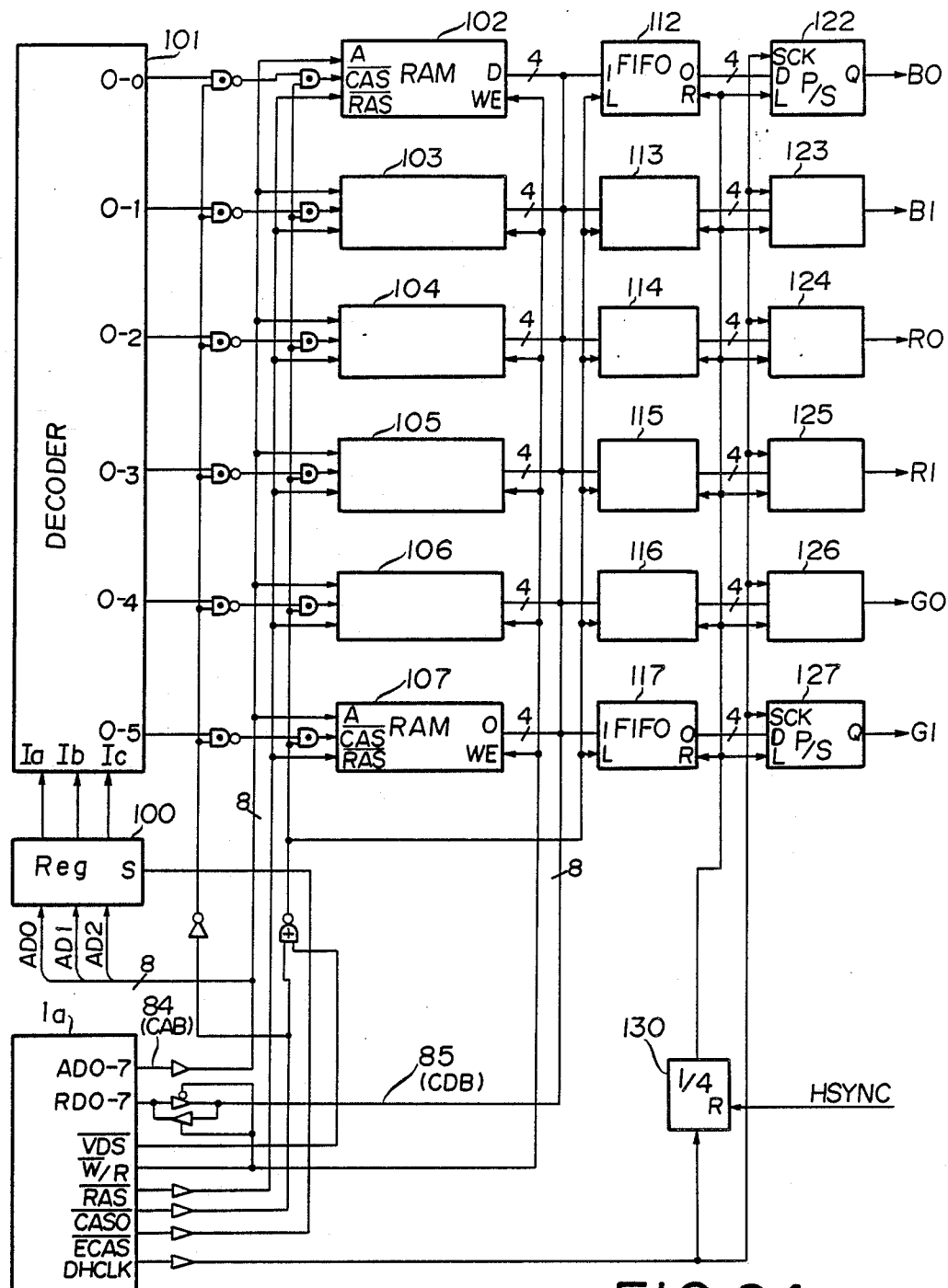
FIG. 24 is a block diagram of the VRAM 4 of the modified video display control system which is designed so that 512 display elements can be displayed on each horizontal scanning line and that each display element can be displayed in a selected one of 64 colors.

FIG. 24 shows a specific construction of the abovedescribed modified system which is designed, by enlarging the VRAM 4, so that 512 display elements can be displayed on each of horizontal scanning lines of the screen and that each display element can be displayed in a selected one of 64 colors. The address strobe signals RAS, CAS0 and ECAS in FIG. 24 are active when they are in the state of "0" (negative logic).

The first to third bits AD0 to AD2 of an address data on the CAB 84 are supplied through respective buffer gates to input terminals of a three-bit register 100. This register 100 loads the bits AD0 to AD2 of the address data thereinto when the column strobe signal ECAS outputted from the VDP 1a is applied to a set input terminal S thereof. In this case, the CPU 2 first sets the bit data MXC in the argument register 32a to "1", and then outputs the bits AD0 to AD2 of the address data. The three-bit data stored in the register 100 is supplied to input terminals Ia, Ib and Ic of a decoder 101 which decodes the three-bit data to select one of six output terminals 0-1 to 0-5 thereof and outputs a "1" signal from the selected output terminal. Six dynamic RAMs corresponding to the VRAM 4 are shown at 102 to 107 each of which comprises for example a 32K byte memory having a plurality of addresses each composed of four bits. Each of the RAMs 102 to 107 is of such a type that latches a row address data and a column address data when the row strobe signal RAS and the column strobe signal CAS0 are supplied. Four-bit output terminals D of the RAMs 102 to 107 are connected alternately to the upper four bits and the lower four bits of the CDB 85. Each of the RAMs 102 to 107 outputs four-bit data on the CDB 85 when a read/write control signal W/R of "1" state is applied thereto. The output terminals D of the RAM 102 to 107 are connected to input terminals I of first-in first-out memories (FIFOs) 112 to 117, respectively. Each of the FIFOs 112 to 117 loads the output data of a respective one of the RAMs 102 to 107 thereinto when a "1" signal is applied to a load terminal L thereof, and outputs data when a "1" signal is applied to a read terminal R thereof. The output data of the FIFOs 112 to 117 are supplied to input terminals of parallel-to-serial converters 122 to 127, respectively. Each of the parallel-to-serial converters 122 to 127 loads the input data thereinto when a "1" signal is applied to a load terminal L thereof, and shifts out the bits of the loaded data one by one in accordance with a clock signal DHCLK of 93 ns applied to a clock terminal SCK thereof. The clock signal DHCLK is generated at a time interval equal to the display internal of the display elements (in this case 512 display elements per one horizontal scanning line). A frequency divider 130 divides the frequency of the clock signal DHCLK, outputted from the VDP 1a, by four to form the "1" signals to be supplied to the load terminal L of the parallel-to-serial converters 122 to 127. The frequency divider 130 is reset when a horizontal synchronization signal HSYNC is applied thereto. When performing an access to the VRAMs 102 to 107, the VDP 1a outputs a signal VDS.

With this arrangement, the CPU 2 first sets the bit data MXC in the argument register 32a to "1" and then makes an access to the register 100 to set one of the bits of this register 100, thereby one of the RAMs 102 to 107 being selected. The CPU 2 then renders the bit data MXC "0" and sequentially outputs address data together with data corresponding to specific bit portions of color codes to be stored into the RAM 102 to 107. The data thus outputted from the CPU 2 are stored into the designated addresses of the selected VRAM in accordance with the strobe signals RAS and CAS0. In this case, the write signal W outputted from the CPU 2 is converted into the read/write control signal W/R which is supplied to each write enable terminal WE of the RAM 102 to 107. The above operation is effected with respect to each of the RAM 102 to 107. Thus, the first-bit portions (color bits B0) of the color codes are stored in the RAM 102, the second-bit portions (color bits B1) of the color codes in the RAM 103, the third-bit portions (color bits R0) of the color codes in the RAM 103, . . . and the sixth-bit portions (color bits G1) of the color codes in the RAM 107.

After the completion of the above operation, the image data processing circuit 10a outputs the signal VDS and accesses the RAMs 102 to 107 in accordance with the strobe signals RAS and CAS0. And therefore, six four-bit data are simultaneously read from the same addresses of the VRAMs 102 to 107, and supplied respectively to the FIFOs 112 to 117. Each of the four-bit data read from the FIFOs 112 to 117 is loaded into a respective one of the parallel-to-serial converters 122 to 127 by the output signal of the frequency divider 130, and the bits of each of the loaded data are serially outputted therefrom in accordance with the clock signal DHCLK. In this case, the pair of color bits B0 and B1 outputted from the parallel-to-serial converter 122 and 123 constitutes color data representative of intensity of blue, the pair of color bits R0 and R1 outputted from the parallel-to-serial converter 124 and 125 constitutes color data representative of intensity of red, and the pair of color bits G0 and G1 outputted from the parallel-to-serial converter 126 and 127 constitutes color data representative of intensity of green. These color data are supplied to the color palette circuit 12, and are converted into analog R, G and B color signals. In this case, a display element can be displayed in one of 64 colors since each color data is composed of two bits ($2^2 \times 2^2 \times 2^2 = 64$). Also, 512 display elements can be displayed on one horizontal scanning line since the display interval of the display elements is 93 ns.

As described above, when writing data into the RAMs 102 to 107, the CPU can selectively accessed one of them, whereas the image data processing circuit 10a can simultaneously access to the same addresses of the RAMs 102 to 107 to read color data to be supplied to the color palett circuit. And therefore, the number of colors and the number of display elements on one horizontal scanning line can be increased in a simple manner.

The construction shown in FIG. 24 can also be applied to the embodiment shown in FIG. 3.

What is claimed is:

1. In a video display control system including memory means having a storage area including a plurality of memory locations for storing a plurality of display data, and adapted to be connected to a video display unit for displaying on a screen of the video display unit, an image composed of a plurality of display elements each represented by a respective one of the plurality of display data stored in the storage area of the memory means, the video display control system comprising:
   (a) first register means for storing first area information representative of a first display area on the screen;
   (b) second register means for storing second area information representative of a second display area of the screen;
   (c) address information generator means for generating first and second address information in accordance with said first and said second area information, respectively, said first address information indicative of first memory locations of the memory means in which display data representative of images of display elements in said first display area are stored, and said second address information indicative of second memory locations of the memory means in which display data representative of images of display elements in said second display area are stored;
   (d) first reading means for reading, in accordance with said first address information, said display data representative of images of the display elements in said first display area from said first memory locations;
   (e) second reading means for reading, in accordance with said second address information, said display data representative of the display elements in said second display area from said second memory locations;
   (f) logical operation means for effecting a logical operation between said display data read from said first memory locations and a corresponding one of said display data read from said second memory locations to produce logically operated display data, said logical operation being an operation from the group consisting of AND, OR, NOT, EXCLUSIVE OR, or transparency processing; and
   (g) writing means for writing, in accordance with said second address information, said operated display data read by said reading means into said second memory locations of said memory means.

2. A video display control system according to claim 1 wherein each of the display data is a color code representative of a color of a respective one of the display elements.

3. A video display control system according to claim 1 further comprising transparency data detection means for detecting that said display data read from said first memory locations is representative of a transparency operation, said operation means outputting said data read from said second memory locations when said transparency operation is detected and said operation means outputting said data read from said first memory locations when said transparency operation is not detected.

4. A video display control system according to claim 1, wherein the screen of the video display unit is composed of an actual display screen and an imaginary screen, each of the display elements of said actual screen being represented by the display data stored in the storage area of the memory means, and each of display elements of said imaginary screen being represented by a respective one of said display data stored in said second storage area of the memory means.

5. A video display control system according to claim 1, wherein the display data stored in the storage area of the memory means are composed of a plurality of groups of display data, each group including more than one display data and being stored in a respective one of the memory locations of the storage area of the memory means.

6. A video display control system adapted to be connected to a video display unit having a screen providing a plurality of display positions for displaying an image composed of a plurality of display elements corresponding respectively to the display positions, comprising:

memory means having a first storage area for storing a plurality of display data, each corresponding to a respective one of the display positions of the screen, and a second storage area for storing a plurality of display data, each corresponding to a respective one of a plurality of display positions of an imaginary screen of the video display unit;

first register means for retaining first area information representative of a first portion of a total display area of said screen and said imaginary screen;

second register means for retaining second area information representative of a second portion of said total display area;

address information generator means for generating first and second address information in accordance with said first and said second area information, respectively, said first address information indicating first memory locations of the memory means in which display data representative of images corresponding to display positions in said first portion of the total display area are stored, and said second address information indicating second memory locations of the memory means on which display data representative of images corresponding to display positions in said second portion of the total display area are stored;

reading means for reading, in accordance with said first address information, said display data representative of images corresponding to the display positions in said first display area portion from said first memory locations;

second reading means for reading, in accordance with said second address information, said display data representative of images corresponding to the display positions in said second display area portion from said second memory locations;

logical operation means for effecting a logical operation between each of said display data read from a first memory locations and a corresponding one of said display data read from said second memory locations, to output logically operated display data, said logical operation being an operation from the group of operations consisting of AND, OR, NOT, EXCLUSIVE OR, or and transparency processing; and writing means for writing, in accordance with said second address information, said logically operated display data read by said reading means into said second memory locations of said memory means.

7. A video display control system according to claim 6, wherein each of the display data is a color code representative of a color of a display element to be displayed at a respective one of the display positions.

8. A video display control system according to claim 6, further comprising transparency data detecting means for detecting that each of said display data read from said first memory locations is representative of transparency, said operation means outputting a corresponding one of said data read from said second memory locations as said operated display data when the transparency is detected, and said operation means outputting said each of the display data read from said first memory locations as said operated display data when the transparency is not detected.

9. In a video display control system including proper memory means having a storage area composed of a plurality of memory locations for storing a plurality of display data and adapted to be connected to a video display unit for displaying, on a screen of the video display unit, an image composed of a plurality of display elements each represented by a respective one of the plurality of display data stored in the storage area of the proper memory means, the video display control system comprising:

extended memory means having a storage area including a plurality of memory locations for storing a plurality of display data;

first register means for retaining first area information representative of a first portion of a total display;

second register means for retaining second area information representative of a second display area on the screen;

address information generator means for generating first and second address information in accordance with said first and said second area information, respectively, said first address information indicating first memory locations in which display data representative of images of display elements in said first display area are stored, and said second address information indicating second memory locations in which display data representative of images of display elements in said second display area are stored;

third register means for storing first and second selection data;

memory selection means for determining which of said proper memory means and said extended memory means is associated with each of said first and second memory locations, based on said first and second selection data;

reading means for reading the display data representative of images of the display elements in said first display area from said first memory location;

writing means for writing said display data read by said reading means into said second location;

second reading means for reading, in accordance with said second address information, said display data representative of the display elements in said second display area from said second memory locations selected in accordance with said selection data;

operation means for effecting a certain operation on each of said display data read from said first memory locations and a corresponding one of said display data read from said second memory locations to produce operated display data; and said writing means writing said operated display data into said second memory locations of the memory means selected in accordance with said second selection data.

10. A video display control system according to claim 9, wherein each of the display data is a color code representative of color of a respective one of display elements.

11. A video display control system according to claim 9 further comprising transparency data detection means for detecting that said display data read from said first memory locations is representative of transparency, said operation means outputting said data read from said second memory locations when the transparency is detected, and said operation means outputting said data read from said first memory locations when the transparency is not detected.

12. A video display control system according to claim 9, wherein the proper memory means further comprises a second storage area composed of a plurality of memory locations of storing a plurality of display data, the screen of the video display unit being composed of an actual display screen and an imaginary screen, each of the display elements of said actual screen being represented by the display data stored in the storage area of the memory means, and each of display elements of said imaginary screen being represented by a respective one of said display data stored in said second storage area of the proper memory means.

13. A video display control system according to claim 9, wherein the display data stored in the storage areas of the memory means are composed of a plurality of groups of display data, each group including more than one display data and being stored in a respective one of the memory locations of the storage areas of the memory means.

14. A video display control system according to claim 9 further comprising:
a central processing unit which has an address bus and a data bus operatively connected to data terminals of said proper memory means and extended memory means;
fourth register means for retaining third selection data supplied from said central processing unit; and address control means responsive to an output of said fourth register means for selectively feeding address information outputted onto said address bus by said central processing unit to address input terminals of one of said proper memory means and said extended memory means;
whereby transfer of display data is effected between said central processing unit and the selected memory means.

* * * * *